US011002364B2

(12) United States Patent
Morinaka

(10) Patent No.: US 11,002,364 B2
(45) Date of Patent: May 11, 2021

(54) LABYRINTH SEAL

(71) Applicant: KOBE STEEL, LTD., Hyogo (JP)

(72) Inventor: Shunsuke Morinaka, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 62 days.

(21) Appl. No.: 16/340,599

(22) PCT Filed: Sep. 29, 2017

(86) PCT No.: PCT/JP2017/035707
§ 371 (c)(1),
(2) Date: Apr. 9, 2019

(87) PCT Pub. No.: WO2018/070282
PCT Pub. Date: Apr. 19, 2018

(65) Prior Publication Data
US 2019/0285183 A1      Sep. 19, 2019

(30) Foreign Application Priority Data

Oct. 13, 2016 (JP) .............................. JP2016-201957

(51) Int. Cl.
*F16J 15/447*      (2006.01)
*F01D 11/02*      (2006.01)
*F01D 11/08*      (2006.01)

(52) U.S. Cl.
CPC ........... *F16J 15/4476* (2013.01); *F01D 11/02* (2013.01); *F01D 11/08* (2013.01); *F16J 15/447* (2013.01);
(Continued)

(58) Field of Classification Search
CPC ........ F16J 15/4476; F16J 15/44; F16J 15/447; F16J 15/4472; F16J 15/4474;
(Continued)

(56) References Cited

U.S. PATENT DOCUMENTS 2,123,818 A    7/1938  Wegmann
5,029,876 A    7/1991  Orlando et al.
(Continued)

FOREIGN PATENT DOCUMENTS

DE    10 2011 052 347 A1    2/2012
EP        2 540 987 A1    1/2013
(Continued)

OTHER PUBLICATIONS

International Search Report issued in PCT/JP2017/035707; dated Dec. 19, 2017.
(Continued)

*Primary Examiner* — Nathan Cumar
(74) *Attorney, Agent, or Firm* — Studebaker & Brackett PC

(57) ABSTRACT

A labyrinth seal includes a step-up structure step portion which is a step portion on a high-pressure side, a step-down structure step portion which is a step portion which is a step portion on a low-pressure side, a fin and an annular groove. The fin is arranged on the low-pressure side relative to the step-down structure step portion. The annular groove is arranged in at least a part of a region on the low-pressure side relative to the step-up structure step portion as well as on the high-pressure side relative to the third fin.

13 Claims, 17 Drawing Sheets

(52) U.S. Cl.
CPC .... *F05D 2240/127* (2013.01); *F05D 2240/24* (2013.01); *F05D 2240/55* (2013.01); *F05D 2240/80* (2013.01)

(58) Field of Classification Search
CPC ....... F16J 15/4478; F01D 11/02; F01D 11/00; F01D 11/08; F01D 11/04; F01D 11/10; F05D 2240/00; F05D 2240/127; F05D 2240/24; F05D 2240/55; F05D 2240/80; F05D 2240/20; F05D 2240/241–243
USPC .......................................... 277/412
See application file for complete search history.

(56) References Cited

U.S. PATENT DOCUMENTS

| | | | | |
|---|---|---|---|---|
| 6,168,377 | B1 * | 1/2001 | Wolfe | F01D 11/001 415/174.2 |
| 6,261,057 | B1 * | 7/2001 | Turnquist | F16J 15/3288 415/174.2 |
| 8,434,766 | B2 * | 5/2013 | Zeng | F01D 11/02 277/419 |
| 2004/0239040 | A1 | 12/2004 | Burgick | |
| 2011/0250073 | A1 | 10/2011 | Neeli | |
| 2011/0280715 | A1 * | 11/2011 | Garg | F01D 11/02 415/174.5 |
| 2012/0027582 | A1 | 2/2012 | Natarajan et al. | |
| 2013/0149118 | A1 | 6/2013 | Lotfi et al. | |
| 2015/0260294 | A1 | 9/2015 | Nakaniwa et al. | |
| 2017/0022838 | A1 | 1/2017 | Kuwamura et al. | |

FOREIGN PATENT DOCUMENTS

| | | |
|---|---|---|
| JP | S51-082855 A | 7/1976 |
| JP | S53-104803 U | 8/1978 |
| JP | S60-098196 A | 6/1985 |
| JP | 2000-097350 A | 4/2000 |
| JP | 2002-228014 A | 8/2002 |
| JP | 2002-535563 A | 10/2002 |
| JP | 2004-353673 A | 12/2004 |
| JP | 2006-052808 A | 2/2006 |
| JP | 2011-220522 A | 11/2011 |
| JP | 2013-019537 A | 1/2013 |
| JP | 2015-108301 A | 6/2015 |
| WO | 2014/077058 A1 | 5/2014 |

OTHER PUBLICATIONS

Written Opinion issued in PCT/JP2017/035707; dated Dec. 19, 2017.

* cited by examiner

LABYRINTH SEAL

TECHNICAL FIELD

The present invention relates to a labyrinth seal.

BACKGROUND ART

A conventional labyrinth seal is disclosed, for example, in Patent Documents 1 and 2. The labyrinth seal prevents a fluid from leaking through a gap between two members (for example, a rotary body and a stationary body) constituting a rotary machine. The labyrinth seal described in FIG. 7 of Patent Document 2 includes a step portion and a plurality of fins. This configuration allows for formation of a vortex in a space between the plurality of fins and generation of fluid energy loss, thereby reducing the leakage rate of the fluid.

CITATION LIST

Patent Documents

Patent Document 1: JP-A-S60-98196
Patent Document 2: JP-A-2015-108301

SUMMARY OF INVENTION

Technical Problem

FIG. 7 of Patent Document 2 illustrates two large vortexes and two small vortexes. As compared with the large vortexes, the small vortexes have less effect of fluid energy loss. For this reason, there is a risk that the leakage rate of the fluid cannot be reduced sufficiently.

Therefore, an object of the present invention is to provide a labyrinth seal capable of reducing the leakage rate of a fluid.

Solution to Problem

The labyrinth seal in the present invention is to be included in a rotary machine. The rotary machine includes a first member, a second member, and a gap. The second member faces the first member. The gap is formed between the first member and the second member and is configured to allow a fluid to flow from a high-pressure side to a low-pressure side in a flow direction that is a direction perpendicular to a direction where the first member and the second member face each other. In a facing direction which is the direction where the first member and the second member face each other, the side of the first member relative to the second member is defined as one side of the facing direction. In the facing direction, the side of the second member relative to the first member is defined as the other side of the facing direction. The labyrinth seal includes a step portion, a fin, and an annular groove. The step portion is formed in a portion of the second member on the one side of the facing direction. The fin extends from a portion of the first member on the one side of the facing direction to the other side of the facing direction. The annular groove is formed in a portion of the second member on the one side of the facing direction. The step portion includes a step-up structure step portion facing the high-pressure side and a step-down structure step portion facing the low-pressure side. In the step-up structure step portion and the step-down structure step portion, a step portion arranged on the high-pressure side is defined as a high-pressure-side step portion, and a step portion arranged on the low-pressure side is defined as a low-pressure-side step portion. The fin includes a first fin, a second fin, and a third fin. The first fin is arranged on the high-pressure side relative to the high-pressure-side step portion. The second fin is arranged on the low-pressure side relative to the high-pressure-side step portion as well as on the high-pressure side relative to the low-pressure-side step portion. The third fin is arranged on the low-pressure side relative to the low-pressure-side step portion. The annular groove is arranged in at least a part of a region on the low-pressure side relative to the high-pressure-side step portion as well as on the high-pressure side relative to the third fin.

Advantageous Effects of the Invention

The configuration above enables a reduction in the leakage rate of a fluid.

DESCRIPTION OF EMBODIMENTS

First Embodiment

Figure 1:
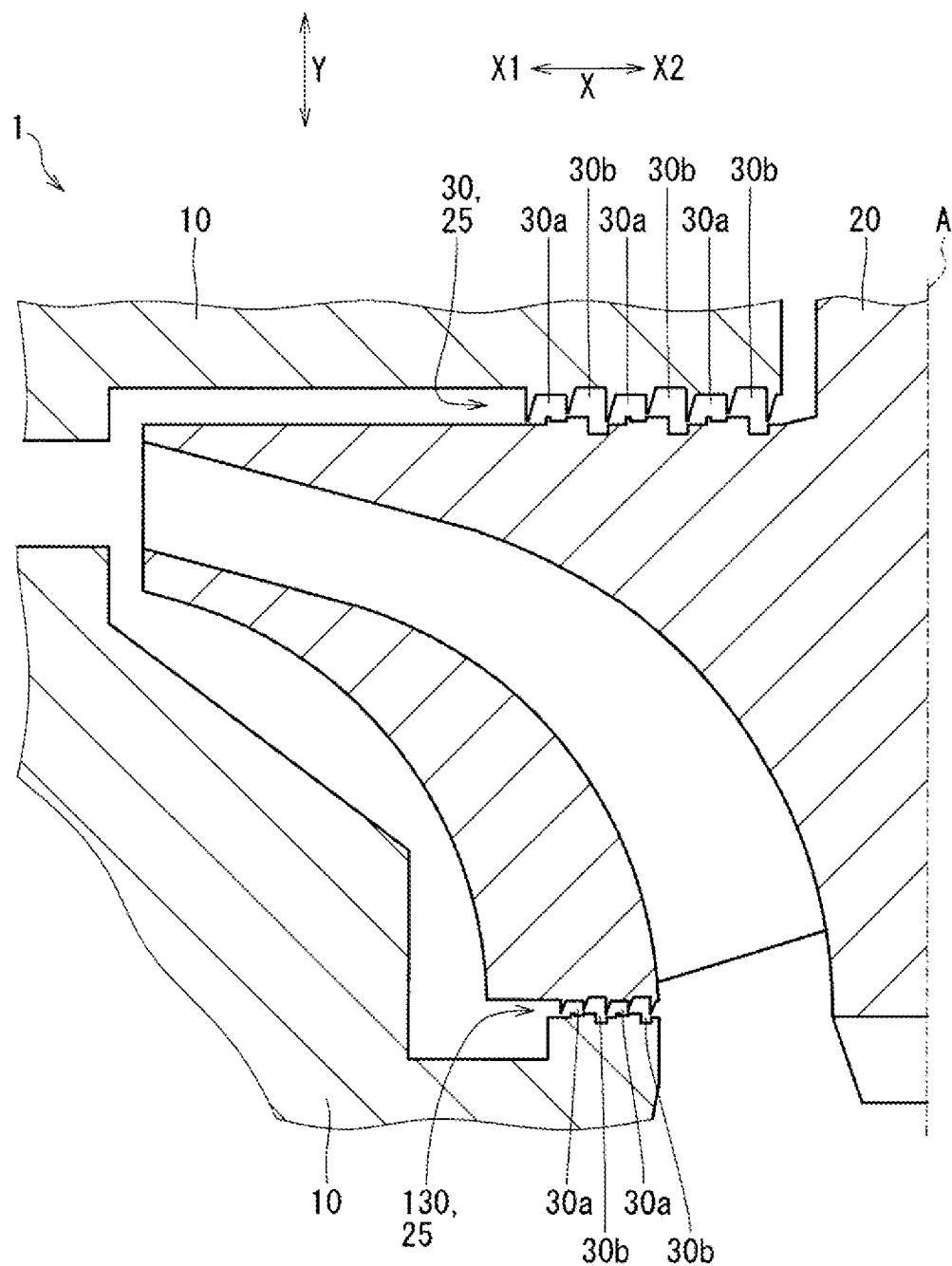
FIG. 1 is a cross-sectional view of a rotary machine according to a first embodiment.

A rotary machine 1 of the first embodiment illustrated in FIG. 1 is described by referring to FIG. 1 to FIG. 6.

The rotary machine 1 (fluid machine, fluid rotary machine) is, for example, a compressor and is, for example, a turbo compressor or the like. The rotary machine 1 may be, for example, an expander and may be, for example, an expansion turbine or the like. The rotary machine 1 is of centrifugal type. The rotary machine 1 includes a stationary body 10 (first member), a rotary body 20 (second member), a gap 25, a labyrinth seal 30, and a labyrinth seal 130. The stationary body 10 is, for example, a casing. The stationary body 10 may be, for example, a member arranged in a casing and fixed to the casing.

The rotary body 20 is arranged inside the stationary body 10 and rotates around a rotation axis A (central axis) relative to the stationary body 10. The rotary body 20 is, for example, an impeller, and is, for example, an impeller with a shroud. The rotary body 20 faces the stationary body 10. The portions in which the labyrinth seal 30 and the labyrinth seal 130 are provided in the rotary body 20 face the stationary body 10.

Figure 2:
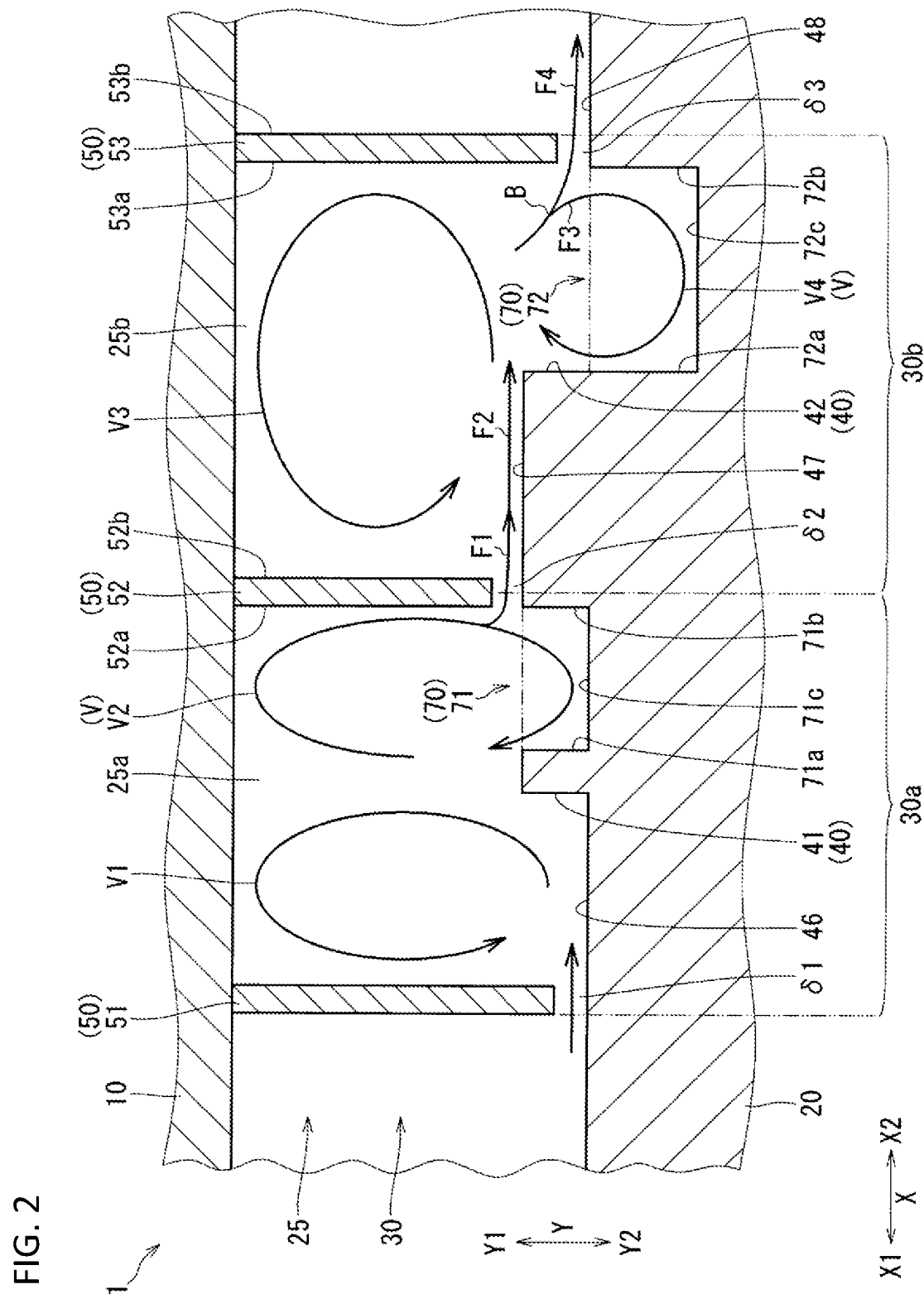
FIG. 2 is a cross-sectional view of a labyrinth seal and the like illustrated in FIG. 1.

The gap 25 is, as illustrated in FIG. 2, formed between the stationary body 10 and the rotary body 20 and is formed between the portion of the stationary body 10 on the other side Y2 (described below) of the facing direction and the portion of the rotary body 20 on the one side Y1 (described below) of the facing direction. A fluid can flow through the gap 25. The gap 25 is configured so as to allow a fluid to flow through the gap 25 from the high-pressure side X1 in the flow direction X to the low-pressure side X2 in the flow direction X. As illustrated in FIG. 1, the flow direction X is a direction perpendicular or approximately perpendicular to the rotation axis A. In the case where the rotary machine 1 is a compressor, the high-pressure side X1 is a side away from the rotation axis A (the radially outer side based on the rotation axis A), and the low-pressure side X2 is a side closer to the rotation axis A (the radially inner side based on the rotation axis A). In the case where the rotary machine 1 is an expander, the high-pressure side X1 is a side closer to the rotation axis A. and the low-pressure side X2 is a side away from the rotation axis A. In the following, the embodiment is described by referring to the case where the rotary machine 1 is a compressor. The direction where the stationary body 10 and the rotary body 20 face each other is defined as a facing direction Y. The facing direction Y is a direction perpendicular to the flow direction X. The facing direction Y is equal (or approximately equal) to the direction of rotation axis A. As illustrated in FIG. 2, in the facing direction Y, the side of the stationary body 10 relative to the rotary body 20 is defined as one side Y1 of the facing direction, and the side of the rotary body 20 relative to the stationary body 10 is defined as the other side Y2 of the facing direction. In the gap 25, the region between a first fin 51 (described below) and a second fin 52 (described below) (the space in the flow direction X) is defined as a space 25*a* on a step-up structure side. In the gap 25, the region between the second fin 52 and the third fin 53 (described below) is defined as a space 25*b* on a step-down structure side.

The labyrinth seal 30 prevents the leakage of a fluid in the gap 25 from the high-pressure side X1 to the low-pressure side X2. The labyrinth seal 30 prevents circulation of the fluid within the rotary machine 1 (see FIG. 1) by preventing the leakage above. The labyrinth seal 30 is an apparatus capable of reducing the leakage flow rate (hereinafter, sometimes referred to as a "leakage rate") of the fluid without the contact of the stationary body 10 with the rotary body 20 (i.e. in a non-contact manner). The labyrinth seal 30 includes a step portion 40, a fin 50, and an annular groove 70.

The step portion 40 is formed in the portion of the rotary body 20 on the one side Y1 of the facing direction. The step portion 40 has an annular shape (ring shape) around the rotation axis A (see FIG. 1). In a plane which is parallel to the rotation axis A and includes the rotation axis A, the cross section of the rotary machine 1 is referred to as a "rotation axis cross-section". The rotation axis cross-section is a cross section as viewed from a direction perpendicular to each of the facing direction Y and the flow direction X. FIG. 1 and FIG. 2 are views of the rotary machine 1 in the rotation axis cross-section. As illustrated in FIG. 2, in the rotation axis cross-section, the step portion 40 has a linear shape extending in the facing direction Y. That is, the step portion 40 has an annular cylindrical shape centering on the rotation axis A. In the rotation axis cross-section, the step portion 40 may be a linear shape which is inclined relative to the facing direction Y (see a step-down structure step portion 542 illustrated in FIG. 10). In this case, the step-down structure step portion 542 (see FIG. 10) has an annular curved surface shape centering on the rotation axis A (see FIG. 1) and has a curved surface shape constituting an outer peripheral portion of a truncated cone centering on the rotation axis A. In the rotation axis cross-section, the step portion 40 may be a curved line shape (not illustrated). In this case, the step portion 40 is an annular curved surface shape centering on the rotation axis A. The same is true for the fin 50 and the annular groove 70 illustrated in FIG. 2 in that the fin and the annular groove are annular shapes centering on the rotation axis A. The step portion 40 includes a step-up structure step portion 41 and the step-down structure step portion 42.

The step-up structure step portion 41 faces (is directed to) the high-pressure side X1. The surface (step surface) of the step-up structure step portion 41 faces the high-pressure side X1. The step-up structure step portion 41 is configured such that the portion (high step portion 47) of the rotary body 20 on the low-pressure side X2 relative to the step-up structure step portion 41 is arranged closer to the one side Y1 of the facing direction than the portion (high-pressure-side low step portion 46) of the rotary body 20 on the high-pressure side X1 relative to the step-up structure step portion 41. The step-up structure step portion 41 is connected to the end of the high-pressure-side low step portion 46 on the low-pressure-side X2. The step-up structure step portion 41 is connected to the end of the high step portion 47 on the high-pressure-side X1.

The step-down structure step portion 42 faces the low-pressure side X2. The surface of the step-down structure step portion 42 faces the low-pressure side X2. The step-down structure step portion 42 is configured such that the portion (low-pressure-side low step portion 48) of the rotary body 20 on the low-pressure side X2 relative to the step-down structure step portion 42 is arranged closer to the other side Y2 of the facing direction than the portion (high step portion 47) of the rotary body 20 on the high-pressure side X1 relative to the step-down structure step portion 42. The step-down structure step portion 42 is connected to the end of the high step portion 47 on the low-pressure-side X2. The step-down structure step portion 42 is connected to the end of the low-pressure-side low step portion 48 on the high-pressure-side X1 through a low-step-portion annular groove 72 (described below). The step-down structure step portion 42 may be connected to the end of the low-pressure-side low step portion 48 on the high-pressure-side X1 (see FIG. 11) (see the description of the following [Position b2].

The high-pressure-side low step portion 46 (high-pressure-side plane) is formed in the portion of the rotary body 20 on the one side Y1 of the facing direction. In the rotation axis cross-section, the high-pressure-side low step portion 46 has a linear shape extending in the flow direction X. That is, the high-pressure-side low step portion 46 has an annular plane centering on the rotation axis A (see FIG. 1). In the rotation axis cross-section, the whole or a part of the high-pressure-side low step portion 46 may be a straight line or a curved line which is inclined relative to the flow direction X. In this case, the high-pressure-side low step portion 46 has an annular curved surface shape (for example, approximately planar shape) centering on the rotation axis A.

The high step portion 47 (an up-step portion, an intermediate step portion, and an intermediate plane) is arranged on the low-pressure side X2 relative to the high-pressure-side low step portion 46 and is arranged on the one side Y of the facing direction relative to the high-pressure-side low step portion 46. The shape of the high step portion 47 is the same as the shape of the high-pressure-side low step portion 46. For example, the high step portion 47 has an annular plane shape centering on the rotation axis A (see FIG. 1).

The low-pressure-side low step portion 48 (down-step portion, low-pressure-side plane) is arranged on the low-pressure side X2 relative to the high step portion 47 and is arranged on the other side Y2 of the facing direction relative to the high step portion 47. The shape of the low-pressure-side low step portion 48 is the same as the shape of the high-pressure-side low step portion 46. For example, the low-pressure-side low step portion 48 has an annular plane shape centering on the rotation axis A (see FIG. 1). The position of the low-pressure-side low step portion 48 in the facing direction Y may be the same as the position of the high-pressure-side low step portion 46 in the facing direction Y, may be on the one side Y1 of the facing direction relative to the high-pressure-side low step portion 46, and may be on the other side Y2 of the facing direction relative to the high-pressure-side low step portion 46.

(High-Pressure-Side X1 Step Portion and Low-Pressure-Side X2 Step Portion)

In the step-up structure step portion 41 and the step-down structure step portion 42, the portion (the step-up structure step portion 41 in this embodiment) arranged on the high-pressure side X1 is defined as a "high-pressure-side X1 step portion", and the portion (the step-down structure step portion 42 in this embodiment) arranged on the low-pressure side X2 is defined as a "low-pressure-side X2 step portion".

The fin 50 is a portion partitioning the gap 25. The fin 50 is arranged not to completely partition the gap 25 by narrowing the gap 25. The fin 50 extends from the portion of the stationary body 10 on the one side Y1 of the facing direction to the other side Y2 of the facing direction and extends to the vicinity of the surface of the rotary body 20 on the one side Y1 of the facing direction. The fin 50 is provided integrally with the stationary body 10. The fin 50 may be separated from the stationary body 10. The fin 50 includes the first fin 51, the second fin 52, and the third fin 53 in the order from the high-pressure side X1 to the low-pressure side X2.

The first fin 51 (high-pressure-side X1 fin) is arranged on the high-pressure side X1 relative to the step-up structure step portion 41. The first fin 51 is arranged at a position facing the high-pressure-side low step portion 46 in the facing direction Y. The position of the distal end (the end on the other side Y2 of the facing direction) of the first fin 51 in the facing direction Y is on the other side Y2 of the facing direction relative to the position of the surface (the surface on the one side Y1 of the facing direction) of the high step portion 47 in the facing direction Y. A gap δ1 in the facing direction Y is present between the distal end of the first fin 51 and the rotary body 20.

The second fin 52 (intermediate fin) is arranged on the low-pressure-side X2 relative to the step-up structure step portion 41 and on the high-pressure side X1 relative to the step-down structure step portion 42. The second fin 52 may be arranged at a position facing the high step portion 47 in the facing direction Y and may be arranged at a position facing the annular groove 70 (a high-step-portion annular groove 71 to be described) in the facing direction Y. A gap δ2 in the facing direction Y is present between the distal end of the second fin 52 and the rotary body 20. The gap δ2 is an outflow port of the fluid from the space 25a on the step-up structure side. The second fin 52 includes a high-pressure-side side surface 52a which is a side surface on the high-pressure side X1 and a low-pressure-side side surface 52 which a the side surface on the low-pressure side X2. The high-pressure-side side surface 52a and the low-pressure-side side surface 52b are surfaces perpendicular to the flow direction X. The above "perpendicular" encompasses "substantially perpendicular" (hereinafter the same).

The third fin 53 (low-pressure-side X2 fin) is arranged on the low-pressure side X2 relative to the step-down structure step portion 42. The third fin 53 may be arranged at a position facing the low-pressure-side low step portion 48 in the facing direction Y and may be arranged at a position facing the annular groove 70 (a low-step-portion annular groove 72 to be described) in the facing direction Y. The position of the distal end of the third fin 53 in the facing direction Y is on the other side Y2 of the facing direction relative to the position of the surface (the surface on the one side Y1 of the facing direction) of the high step portion 47 in the facing direction Y. As described above, the third fin 53, the first fin 51 and the high step portion 47 are arranged so that the position of each distal end of the third fin 53 and the first fin 51 and the position of the high step portion 47 in the facing direction Y are different from each other (that is, are arranged alternately). Accordingly, the fluid is prevented from flowing (passing through) in the flow direction X without contacting with the fin 50 and the step portion 40. A gap δ3 in the facing direction Y is present between the distal end of the third fin 53 and the rotary body 20. The gap δ3 is an outflow port of the fluid flowing from the space 25b on the step-down structure side and an outflow port of the fluid flowing from the labyrinth seal 30. The third fin 53 includes a high-pressure-side side surface 53a which is a side surface on the high-pressure side X1 and a low-pressure-side side surface 53b which is a side surface on the low-pressure side X2. The high-pressure-side side surface 53a and the low-pressure-side side surface 53b are surfaces perpendicular to the flow direction X.

(High-Step Portion-Side Fin and Low-Step Portion-Side Fin)

In the fins 50 on the low-pressure side X2 relative to the step-up structure step portion 41, the fin closest to the step-up structure step portion 41 is defined as a "high-step portion-side fin". In this embodiment, the "high-step portion-side fin" is the second fin 52. In the fins 50 on the low-pressure side X2 relative to the step-down structure step portion 42, the fin closest to the step-down structure step portion 42 is defined as a "low-step portion-side fin". In this embodiment, the "low-step portion-side fin" is the third fin 53.

The annular groove 70 is a groove for allowing a vortex V (any one of a vortex V2 and a vortex V4) to flow in. The annular groove 70 is provided at a portion (place) where the vortex V is generated and is configured such that the vortex V flows in the space (the inside of the annular groove 70) surrounded by the annular groove 70. The annular groove 70 is formed in the portion of the rotary body 20 on the one side Y1 of the facing direction. The annular groove 70 is arranged in at least a part of a region on the low-pressure side X2 relative to the high-pressure-side X1 step portion (step-up structure step portion 41) and on the high-pressure side X1 relative to the third fin 53. The annular groove 70 includes the high-step-portion annular groove 71 and the low-step-portion annular groove 72.

The high-step-portion annular groove 71 (up-step groove) is a groove for allowing the vortex V2 to flow in. The high-step-portion annular groove 71 is formed in the high step portion 47 and is recessed toward the other side Y2 of the facing direction relative to the end of the high step portion 47 on the one side Y1 of the facing direction. The high-step-portion annular groove 71 is arranged in at least a part of a region on the low-pressure side X2 relative to the step-up structure step portion 41 and on the high-pressure side X1 relative to the high-step portion-side fin (second fin 52). A part of the high-step-portion annular groove 71 may be arranged on the low-pressure side X2 relative to the high-pressure-side side surface 52a.

In the portion which is the end of the high-step-portion annular groove 71 on the one side Y1 of the facing direction and the end of the high-step-portion annular groove 71 on the high-pressure-side X1, the flow direction X position (the position in the flow direction X) is on the low-pressure side X2 relative to the portion which is the end of the step-up structure step portion 41 on the one side Y1 of the facing direction and the end of the step-up structure step portion 41 on the low-pressure-side X2.

In the portion which is the end of the high-step-portion annular groove 71 on the one side Y1 of the facing direction and the end of the high-step-portion annular groove 71 on the low-pressure-side X2, the flow direction X position is any one of the following [Position a1] to [Position a5]. [Position a1] On the high-pressure side X1 relative to the distal end (the end on the other side Y2 of the facing direction) of the high-pressure-side side surface 52a [Position a2] The same (or substantially the same) flow direction X position as the distal end of the high-pressure-side side surface 52a. [Position a3] On the low-pressure side X2 relative to the distal end of the high-pressure-side side surface 52a and on the high-pressure side X1 relative to the distal end of the low-pressure-side side surface 52b. [Position a4] The same (or substantially the same) flow direction X position as the distal end of the low-pressure-side side surface 52b. [Position a5] On the low-pressure side X2 relative to the low-pressure-side side surface 52b.

The high-step-portion annular groove 71 has an annular shape centering on the rotation axis A (see FIG. 1). In the rotation axis cross-section, the shape of the portion (the inside of the high-step-portion annular groove 71) surrounded by the high-step-portion annular groove 71 is a rectangular shape. In FIG. 2, the end of "the portion surrounded by the high-step-portion annular groove 71" on the one side Y1 of the facing direction is denoted by a two-dot chain line. The high-step-portion annular groove 71 includes a high-pressure-side side surface 71a which is a side surface on the high-pressure side X1, a low-pressure-side side surface 71b which is a side surface on the low-pressure side X2, and a bottom surface 71c. The high-pressure-side side surface 71a and the low-pressure-side side surface 71b are surfaces perpendicular to the flow direction X. The bottom surface 71c is a surface of the portion of the high-step-portion annular groove 71 on the other side Y2 of the facing direction and a surface constituting the bottom (the bottom based on the surface of the low-pressure-side low step portion 48) of the high-step-portion annular groove 71. The bottom surface 71c is a surface perpendicular to the facing direction Y.

The low-step-portion annular groove 72 (down-step groove) is a groove for allowing the vortex V4 to flow in. The low-step-portion annular groove 72 is formed in the low-pressure-side low step portion 48 and is recessed toward the other side Y2 of the facing direction relative to the end of the low-pressure-side low step portion 48 on the one side Y1 of the facing direction. The low step portion annular groove 72 is arranged in at least a part of a region on the low-pressure side X2 relative to the step-down structure step portion 42 and on the high-pressure side X1 relative to the low-step portion-side fin (third fin 53). A part of the low-step-portion annular groove 72 may be arranged on the low-pressure side X2 relative to the high-pressure-side side surface 53a.

In the portion which is the end of the low-step-portion annular groove 72 on the one side Y1 of the facing direction and the end of the low-step-portion annular groove 72 on the high-pressure-side X1, the flow direction X position is any one of the following [Position b1] and [Position b2]. [Position b1]: The same position as the portion which is the end of the step-down structure step portion 42 on the other side Y2 of the facing direction and the end of the step-down structure step portion 42 on the low-pressure-side X2. [Position b2]: On the low-pressure side X2 (not illustrated) relative to the portion which is the end of the step-down structure step portion 42 on the other side Y2 of the facing direction and the end of the step-down structure step portion 42 on the low-pressure-side X2. In the case of [Position b1] above, the low-step-portion annular groove 72 is arranged on the low-pressure side X2 relative to the position of the step-down structure step portion 42. In the case of [Position b2] above, a gap (a part of the low-pressure-side low step portion 48) in the flow direction X is formed between the portion which is the end of the step-down structure step portion 42 on the other side Y2 of the facing direction and the end of the step-down structure step portion 42 on the low-pressure-side X2, and the portion which is the end of the low-step-portion annular groove 72 on the high-pressure-side X1 and the end of the low-step-portion annular groove 72 on the one side Y1 of the facing direction.

In the position which is the end of the low-step-portion annular groove 72 on the one side Y1 of the facing direction and the end of the low-step-portion annular groove 72 on the low-pressure-side X2, the flow direction X position is any one of the following [Position c1] to [Position c5]. [Position c1]: On the high-pressure side X1 relative to the distal end (the end on the other side Y2 of the facing direction) of the high-pressure-side side surface 53a. [Position c2]: The same (or substantially the same) flow direction X position as the distal end of the high-pressure-side side surface 53a. [Position c3]: On the low-pressure side X2 relative to the distal end of the high-pressure-side side surface 53a and on the high-pressure side X1 relative to the distal end of the low-pressure-side side surface 53b. [Position c4]: The same (or substantially the same) flow direction X position as the distal end of the low-pressure-side side surface 53b. [Position c5]: On the low-pressure side X2 relative to the low-pressure-side side surface 53b.

The low-step-portion annular groove 72 is an annular shape centering on the rotation axis A (see FIG. 1). In the rotation axis cross-section, the shape of the portion (the inside of the low-step-portion annular groove 72) surrounded by the low-step-portion annular groove 72 is the same (or substantially the same) as the shape of the portion surrounded by the high-step-portion annular groove 71 and has a rectangular shape. In FIG. 2, the end of "the portion surrounded by the low-step-portion annular groove 72" on the one side Y1 of the facing direction is denoted by a two-dot chain line. In the example illustrated in FIG. 2, the portion surrounded by the low-step-portion annular groove 72 is larger than the portion surrounded by the high-step-portion annular groove 71. Similarly to the high-step-portion annular groove 71, the low-step-portion annular groove 72 includes a high-pressure-side side surface 72a which is a side surface of the high-pressure side X1, a low-pressure-side side surface 72b which is a side surface of the low-pressure side X2, and a bottom surface 72c. In the rotation axis cross-section, the high-pressure-side side surface 72a and the step-down structure step portion 42 have a linear shape extending in the facing direction Y.

(Structure 30a and Structure 30b)

In the labyrinth seal 30, the portion where the space 25a of the step-up structure side is formed is defined as the structure 30a on the step-up structure side. The structure 30a on the step-up structure side includes two fins 50 (first fin 51, and second fin 52), the step-up structure step portion 41, and the high-step-portion annular groove 71. In the labyrinth seal 30, the portion where the space 25b on the step-down structure side is formed is defined as a structure 30b on the step-down structure side. The structure 30b on the step-down structure side includes two fins 50 (second fin 52, and third fin 53), the step-down structure step portion 42, and the low-step-portion annular groove 72.

As illustrated in FIG. 1, the labyrinth seal 130 is configured to be almost similar to the labyrinth seal 30. The difference between the labyrinth seal 130 and the labyrinth seal 30 is as follows. As illustrated in FIG. 2, in the labyrinth seal 30, the fin 50 is provided in the stationary body 10, and the step portion 40 and the annular groove 70 are provided in the rotary body 20. On the other hand, in the labyrinth seal 130 (see FIG. 1), the fin 50 is provided in the rotary body 20, and the step portion 40 and the annular groove 70 are provided in the stationary body 10.

(First Member and Second Member)

The "first member" is a member in which the fin 50 is provided. The first member is the stationary body 10 in the labyrinth seal 30 and is the rotary body 20 in the labyrinth seal 130 (see FIG. 1). The "second member" is a member in which the step portion 40 and the annular groove 70 are provided. The second member is the rotary body 20 in the labyrinth seal 30 and is the stationary body 10 in the labyrinth seal 130 (see FIG. 1).

(Flow of Fluid)

The fluid flowing through the gap 25 illustrated in FIG. 2 flows as follows. The fluid passes through the gap δ1 from the high-pressure side X1 relative to the first fin 51 and flows into the space 25a on the step-up structure side and forms the vortex V1. The vortex V1 is formed as follows. The fluid flows straight (or flows substantially straight) to the low-pressure side X2 substantially along the surface (the surface on the one side Y1 of the facing direction) of the high-pressure-side low step portion 46, contacts (collides with) the step-up structure step portion 41, and flows (shift) to the one side Y1 of the facing direction. This flow comes into contact with the surface of the stationary body 10 on the other side Y2 of the facing direction and flows to the high-pressure side X1 substantially along the surface of the stationary body 10 on the other side Y2 of the facing direction. Further, this flow comes into contact with the first fin 51 to flow to the other side Y2 of the facing direction substantially along the first fin 51 and comes into contact with the high-pressure-side low step portion 46 to flow the low-pressure side X2. Then, the vortex V1 is formed.

The fluid coming into contact with the step-up structure step portion 41 and flowing to the one side Y1 of the facing direction branches into the vortex V1 and the vortex V2 on the low-pressure side X2 relative to the vortex V1 when. The vortex V2 is formed as follows. The fluid branched from the vortex V1 comes into contact with the surface of the stationary body 10 on the other side Y2 of the facing direction to flow to the low-pressure side X2 substantially along the surface of the stationary body 10 on the other side Y2 of the facing direction and comes into contact with the high-pressure-side side surface 52a of the second fin 52 to flow to the other side Y2 of the facing direction substantially along the high-pressure-side side surface 52a. This flow flows into the high-step-portion annular groove 71 and flows substantially along the inner surface of the high-step-portion annular groove 71. This flow flows to the other side Y2 of the facing direction substantially along the low-pressure-side side surface 71b, flows to the high-pressure side X1 substantially along the bottom surface 71c, flows to the one side Y1 of the facing direction substantially along the high-pressure-side side surface 71a, and flows out of the high-step-portion annular groove 71. Then the vortex V2 is formed.

The fluid flowing to the other side Y2 of the facing direction substantially along the high-pressure-side side surface 52a branches into the vortex V2 and a branch flow F1 which is a flow toward the gap 62. The branch flow F1 passes through the gap 62 and flows to the low-pressure side X2, flows out (leak) of the space 25a on the step-up structure side, and flows into the space 25b on the step-down structure side.

The fluid flowing to the other side Y2 of the facing direction substantially along the high-pressure-side side surface 52a flows in the high-step-portion annular groove 71, so that the flow rate of the branch flow F1 is reduced. Thus, the leakage rate of the fluid from the space 25a on the step-up structure side is reduced. In addition, the friction between fluids is generated by the vortex V1 and the vortex V2 which are formed in the space 25a on the step-up structure side, and the energy loss of the fluid occurs, so that the leakage rate of the fluid from the space 25a on the step-up structure side is reduced. The friction between fluids encompasses friction between fluids and friction between the fluid and a wall surface. The wall surface may be regarded as a fluid with a flow velocity of 0. For example, as the wall surface, the surface of the high-step-portion annular groove 71 is exemplified.

The branch flow F1 flows into the space 25b on the step-down structure side and forms a main flow F2. First, the main flow F2 flows straight (or flows substantially straight) (hereinafter the same) to the low-pressure side X2 substantially along the surface (the surface on the one side Y1 of the facing direction) of the high step portion 47. Next, the main flow F2 flows straight to the low-pressure side X2 even though separated from the surface of the high step portion 47.

A partial flow of the main flow F2 forms the vortex V3. The vortex V3 is formed as follows. The partial flow of the main flow F2 comes into contact with the third fin 53 and branches (shift) to the one side Y1 of the facing direction from the main flow F2. This flow flows to the one side Y1 of the facing direction substantially along the high-pressure-side side surface 53a to come into contact with the surface of the stationary body 10 on the other side Y2 of the facing direction and flows to the high-pressure side X1 substantially along the surface of the stationary body 10 on the other side Y2 of the facing direction to come into contact with the low-pressure-side side surface 52b of the second fin 52. This flow flows to the other side Y2 of the facing direction substantially along the low-pressure-side side surface 52b. This flow joins the main flow F2 or flows to the low-pressure side X2 near the main flow F2. Then, the vortex V3 is formed.

The partial flow of the main flow F2 comes into contact with the high-pressure-side side surface 53a of the third fin 53 and shifts to the other side Y2 of the facing direction. At a branch point B, this flow branches into a branch flow F3 substantially along the low-pressure-side side surface 72b and a branch flow F4 flowing toward the gap δ3.

The branch flow F3 forms the vortex V4 flowing in the low-step-portion annular groove 72 or the like. The vortex V4 is formed as follows. The vortex V4 flows substantially along the inner surface of the low-step-portion annular groove 72. The branch flow F3 flows to the other side Y2 of the facing direction substantially along the low-pressure-side side surface 72b, flows to the high-pressure side X1 substantially along the bottom surface 72c, and flows to the one side Y1 of the facing direction substantially along the high-pressure-side side surface 72a. This fluid joins the main flow F2 or flows to the low-pressure side X2 near the main flow F2. Then, the vortex V4 is formed. The shape of the vortex V4 in the rotation axis cross-section is an approximately circular shape. The shape of the vortex V4 in the rotation axis cross-section may be a flat and approximately circular shape (approximately elliptical shape) in which the width in the flow direction X is larger than the width in the facing direction Y and may be an approximately circular shape in which the width in the facing direction Y is larger than the width of the flow direction X.

The branch flow F4 passes through the gap δ3 and flows to the low-pressure side X2 and flow out (leak) of the space 25b on the step-down structure side.

The branch flow F3 flows in the low-step-portion annular groove 72, so that the flow rate of the branch flow F4 is reduced. Thus, the leakage rate of the fluid from the space 25b on the step-down structure side is reduced. In addition, the friction between fluids is generated by the vortex V4, and the energy loss of the fluid occurs, so that the leakage rate of the fluid from the space 25b on the step-down structure side is reduced. The friction between fluids encompasses friction between fluids and friction between the fluid and the wall surface. The wall surface may be regarded as a fluid with a flow velocity of 0. For example, as the wall surface, the surfaces (a high-pressure-side side surface 72a, a bottom surface 72c, and a low-pressure-side side surface 72b) of the low-step-portion annular groove 72 are exemplified.

(Dimension)

When the annular groove 70 is provided in at least a part of the region on the low-pressure side X2 relative to the step-up structure step portion 41 and on the high-pressure side X1 relative to the third fin 53, the effect (to reduce the leakage rate) based on the annular groove 70 is obtained. Further, the effect based on the annular groove 70 can be improved further by satisfying the following conditions.

(Preferable Conditions Regarding the High-Step-Portion Annular Groove 71)

Figure 3:
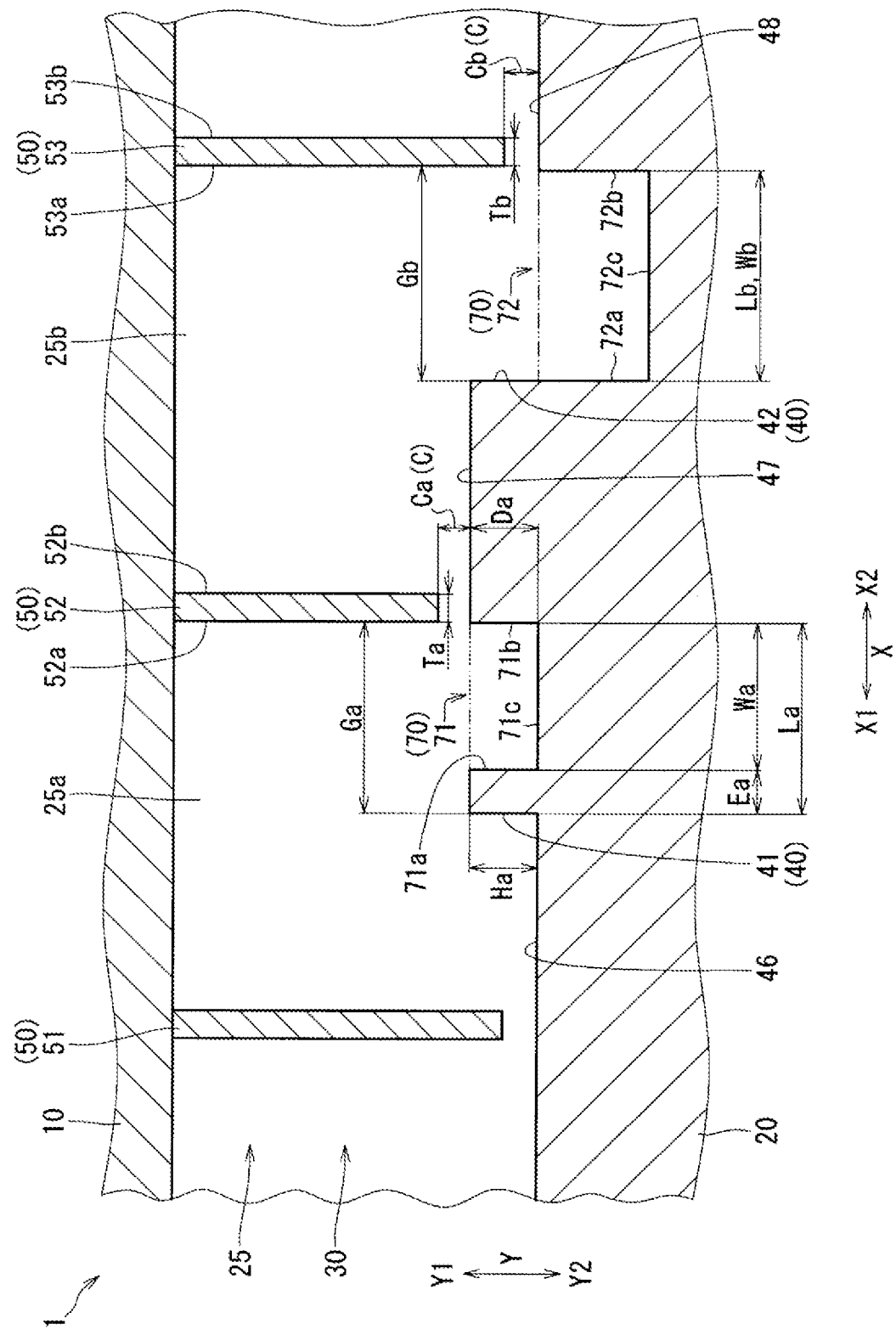
FIG. 3 is a cross-sectional view of the labyrinth seal illustrated in FIG. 2 for showing a dimension.

As illustrated in FIG. 3, in the rotation axis cross-section, the dimensions in the flow direction X have a distance La, a distance Ga, an opening width Wa, a distance Ea, and a thickness Ta. These dimensions are defined as follows.

The distance La is a distance (minimum distance, distance between) in the flow direction X from the step-up structure step portion 41 to the portion which is the end of the high-step-portion annular groove 71 on the one side Y1 of the facing direction as well as the end of the high-step-portion annular groove 71 on the low-pressure-side X2. In a case where the step-up structure step portion 41 has a width in the flow direction X, for example, the step-up structure step portion 41 is inclined relative to the facing direction Y. In this case, the starting point of the distance La on the high-pressure side X1 is the portion which is the end of the step-up structure step portion 41 on the one side Y1 of the facing direction and the end of the step-up structure step portion 41 on the low-pressure-side X2 (the same is true also for the distance Ga and the distance Ea). In this embodiment, the distance La is a distance in the flow direction X from the step-up structure step portion 41 to the low-pressure-side side surface 71b.

The distance Ga is a distance (minimum distance) in the flow direction X from the step-up structure step portion 41 to the portion which is the distal end of the second fin 52 as well as the end of the second fin 52 on the high-pressure-side X1. In this embodiment, the distance Ga is a distance in the flow direction X from the step-up structure step portion 41 to the high-pressure-side side surface 52a.

The opening width Wa is a width of the opening of the high-step-portion annular groove 71 in the flow direction X. More specifically, the opening width Wa is a width of the end of the high-step-portion annular groove 71 on the one side Y1 of the facing direction in the flow direction X. The distance Ea is a distance in the flow direction X from the step-up structure step portion 41 to the portion which is the end of the high-pressure-side side surface 71a on the one side Y1 of the facing direction as well as the end of the high-pressure-side side surface 71a on the high-pressure-side X1. The distance Ea is a distance obtained by subtracting the opening width Wa from the distance La.

The thickness Ta is a width of the distal end of the second fin 52 in the flow direction X. Herein, "the distal end of the second fin 52" is a portion where the branch flow F1 (see FIG. 2) can directly come into contact. In the example illustrated in FIG. 7, the branch flow F1 does not directly come into contact with the low-pressure-side side surface 52b. Thus, the low-pressure-side side surface 52b is not included in the meaning of "the distal end of the second fin 52".

As illustrated in FIG. 3, in the rotation axis cross-section, the dimensions in the facing direction Y have a height Ha and a depth Da. These dimensions are defined as follows.

The height Ha is a width of the step-up structure step portion 41 in the facing direction Y. More specifically, the height Ha is a distance in the facing direction Y between the end of the surface (the surface on the one side Y1 of the facing direction) of the high-pressure-side low step portion 46 on the low-pressure-side X2 and the end of the surface (the surface on the one side Y1 of the facing direction) of the high step portion 47 on the high-pressure-side X1.

The depth Da is a width of the high-step-portion annular groove 71 in the facing direction Y. More specifically, the depth Da is a distance in the facing direction Y between the end (for example, the bottom surface 71c) of the high-step-portion annular groove 71 on the other side Y2 of the facing direction and the surface (the surface of the one side Y1 of the facing direction) of the high step portion 47.

(Preferable Conditions Regarding the Opening Width Wa and the Distance Ea)

When the opening width Wa is increased, the vortex V2 (see FIG. 2) is likely to flow into the high-step-portion annular groove 71, and the vortex V2 can be formed large. As a result, the energy loss can be increased further. For example, it is preferable to satisfy the relationship "Wa/

Ga>0.2". In addition, when the distance Ea is reduced, the vortex V2 can be formed large. As a result, the energy loss can be increased further. For example, it is preferable to satisfy the relationship "Ea/Ga<0.8".

(Preferable Conditions Regarding the Distance Ga and the Distance La)

Preferably, the position of the low-pressure-side side surface 71b in the flow direction X is the same position (on the same surface) as the position of the high-pressure-side side surface 52a in the flow direction X or is on the low-pressure side X2 therefrom (preferably, Ga≤La). As illustrated in FIG. 2, when the relationship "Ga≤La" is satisfied, the vortex V2 flowing to the other side Y2 of the facing direction along the second fin 52 is likely to flow into the high-step-portion annular groove 71, and the flow rate of the branch flow F1 can be reduced. Since the fluid is likely to flow into the high-step-portion annular groove 71, the flow velocity of the vortex V2 can be increased, and as a result, the energy loss can be increased.

Figure 4:
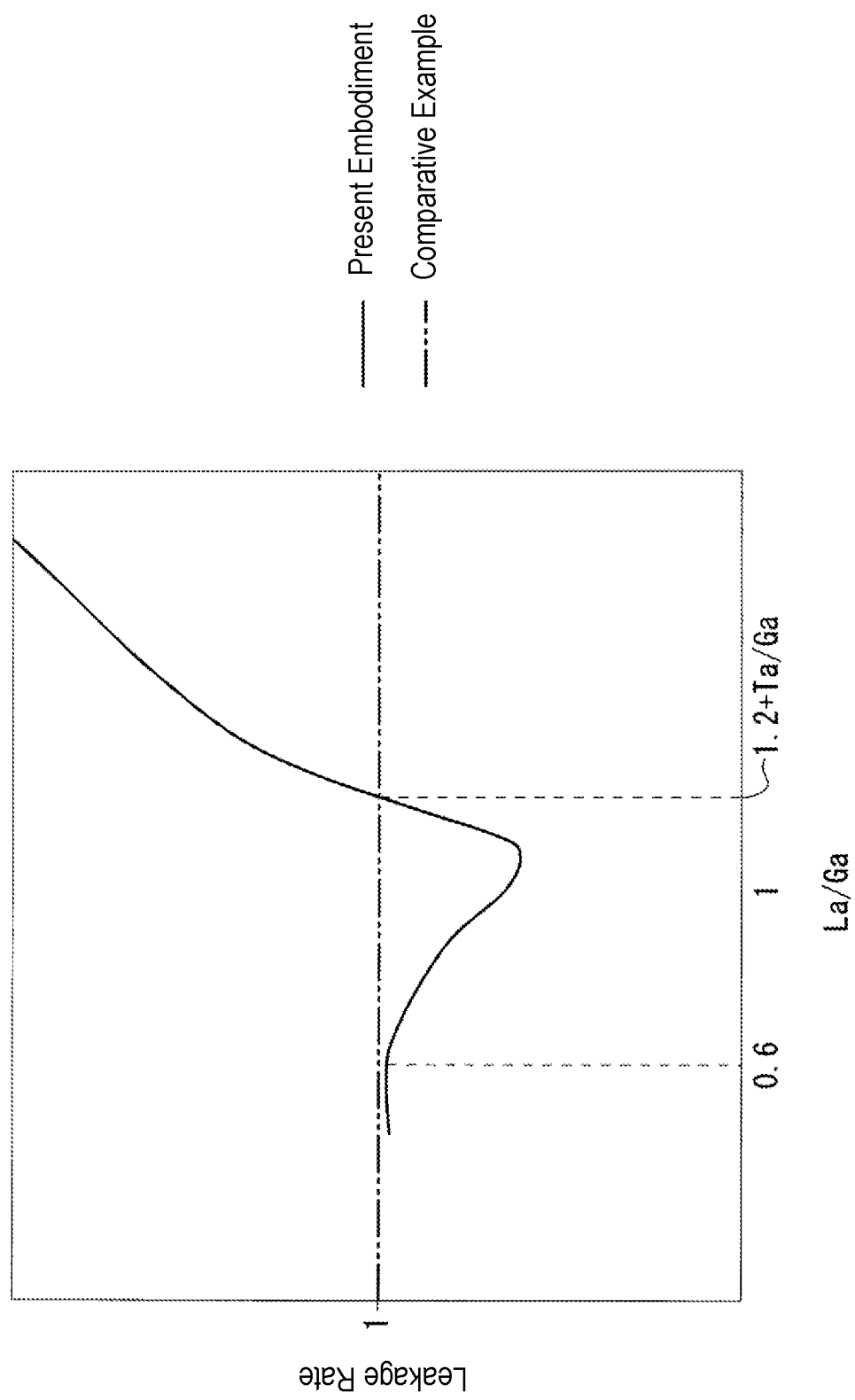
FIG. 4 is a graph showing the relationship between La/Ga (see FIG. 3) and a leakage rate.

The position of the high-pressure-side side surface 52a, the position of the low-pressure-side side surface 71b, and the leakage rate are examined by CFD (computational fluid dynamics) analysis. As a result, it is found that the leakage rate is changed depending on La/Ga as shown in FIG. 4. "Comparative Example" of FIG. 4 is the case of a labyrinth seal which does not include the high-step-portion annular groove 71 illustrated in FIG. 2. In the graph shown in FIG. 4, the unit of the leakage rate of the vertical axis is set dimensionless, and specifically, the leakage rate in Comparative Example is set to 1 (the same is true for FIG. 5).

When the high-pressure-side side surface 52a illustrated in FIG. 2 is away too much toward the high-pressure side X1 relative to the low-pressure-side side surface 71b, the fluid flowing along the second fin 52 in the other side Y2 of the facing direction is less likely to flow into the high-step-portion annular groove 71. As a result, the effect of reducing the leakage rate is reduced. In addition, when the low-pressure-side side surface 71b is away too much toward the low-pressure side X2 relative to the high-pressure-side side surface 52a, the gap δ2 between the second fin 52 and the rotary body 20 is enlarged. Thus, the fluid is likely to pass through the gap δ2, and the effect of reducing the leakage rate is reduced.

In this regard, as shown in FIG. 4, it is preferable to satisfy the relationship "0<La/Ga<1.2+Ta/Ga". In this case, the leakage rate can be reduced reliably as compared with the case of Comparative Example. In addition, it is more preferable to satisfy the relationship "0.6<La/Ga<1.2+Ta/Ga". In this case, the leakage rate can be reduced further.

(Preferable Conditions Regarding the Height Ha and the Depth Da)

Figure 5:
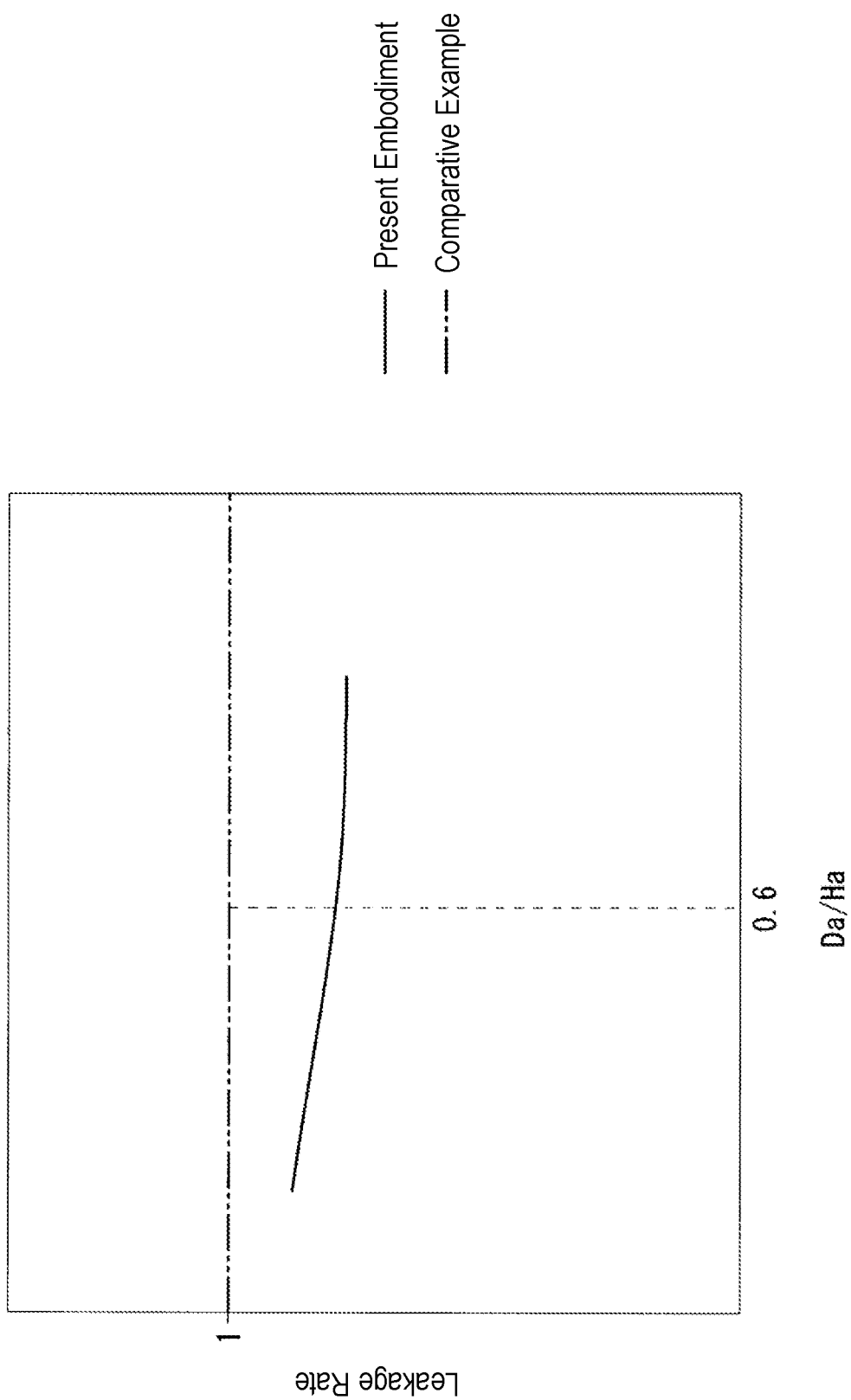
FIG. 5 is a graph showing the relationship between Da/Ha (see FIG. 3) and a leakage rate.

The height Ha, the depth Da, and the leakage rate illustrated in FIG. 3 are examined by the CFD analyzing. As a result, it is found that the leakage rate is changed depending on Da/Ha as shown in FIG. 5. When the depth Da illustrated in FIG. 3 is small, the flow of the vortex V2 capable of flowing into the high-step-portion annular groove 71 illustrated in FIG. 2 becomes small, and the flow rate of the branch flow F1 is increased, and thus, the leakage rate is increased. In this regard, it is preferable to satisfy the relationship "0.6<Da/Ha" as shown in FIG. 5. In this case, the leakage rate can be reduced reliably as compared with the case of Comparative Example. When the relationship "0<Da/Ha" is satisfied, the effect of reducing the leakage rate is obtained as compared with the case of Comparative Example.

(Preferable Conditions Regarding the Low-Step-Portion Annular Groove 72)

As illustrated in FIG. 3, in the rotation axis cross-section, the dimensions in the flow direction X have a distance Gb, a distance Lb. and an opening width Wb. These dimensions are defined as follows.

The distance Gb is a distance (minimum distance) in the flow direction X from the step-down structure step portion 42 to the portion which is the distal end of the third fin 53 as well as the end of the third fin 53 on the high-pressure-side X1. In a case where the step-down structure step portion 42 has a width in the flow direction X, the starting point of the distance Gb on the high-pressure side X1 is the portion which is the end of the step-down structure step portion 42 on the other side Y2 of the facing direction and the end of the step-down structure step portion 42 on the low-pressure-side X2 (see FIG. 10) (the same is true for the starting point of the distance Lb on the high-pressure side X1). As the case where the step-down structure step portion 42 has a width in the flow direction X, examples thereof include a case where the step-down structure step portion 42 is inclined relative to the facing direction Y. In this embodiment, the distance Gb is a distance in the flow direction X from the step-down structure step portion 42 to the high-pressure-side side surface 53a.

The distance Lb is a distance (minimum distance) in the flow direction X from the step-down structure step portion 42 to the portion which is the end of the low-step-portion annular groove 72 on the one side Y1 of the facing direction as well as the end of the low-step-portion annular groove 72 on the low-pressure-side X2. In this embodiment, the distance Lb is a distance in the flow direction X from the step-down structure step portion 42 to the low-pressure-side side surface 72b.

The opening width Wb is a width of the opening of the low-step-portion annular groove 72 in the flow direction X. More specifically, the opening width Wb is the width of the end of the low-step-portion annular groove 72 on the one side Y1 of the facing direction in the flow direction X. In this embodiment, the opening width Wb is equal to the distance Lb. For this reason, in the following preferable conditions regarding the distance Lb, the "distance Lb" may be interchanged with the "opening width Wb".

(Preferable Conditions Regarding the Distance Gb and the Distance Lb)

Figure 6:
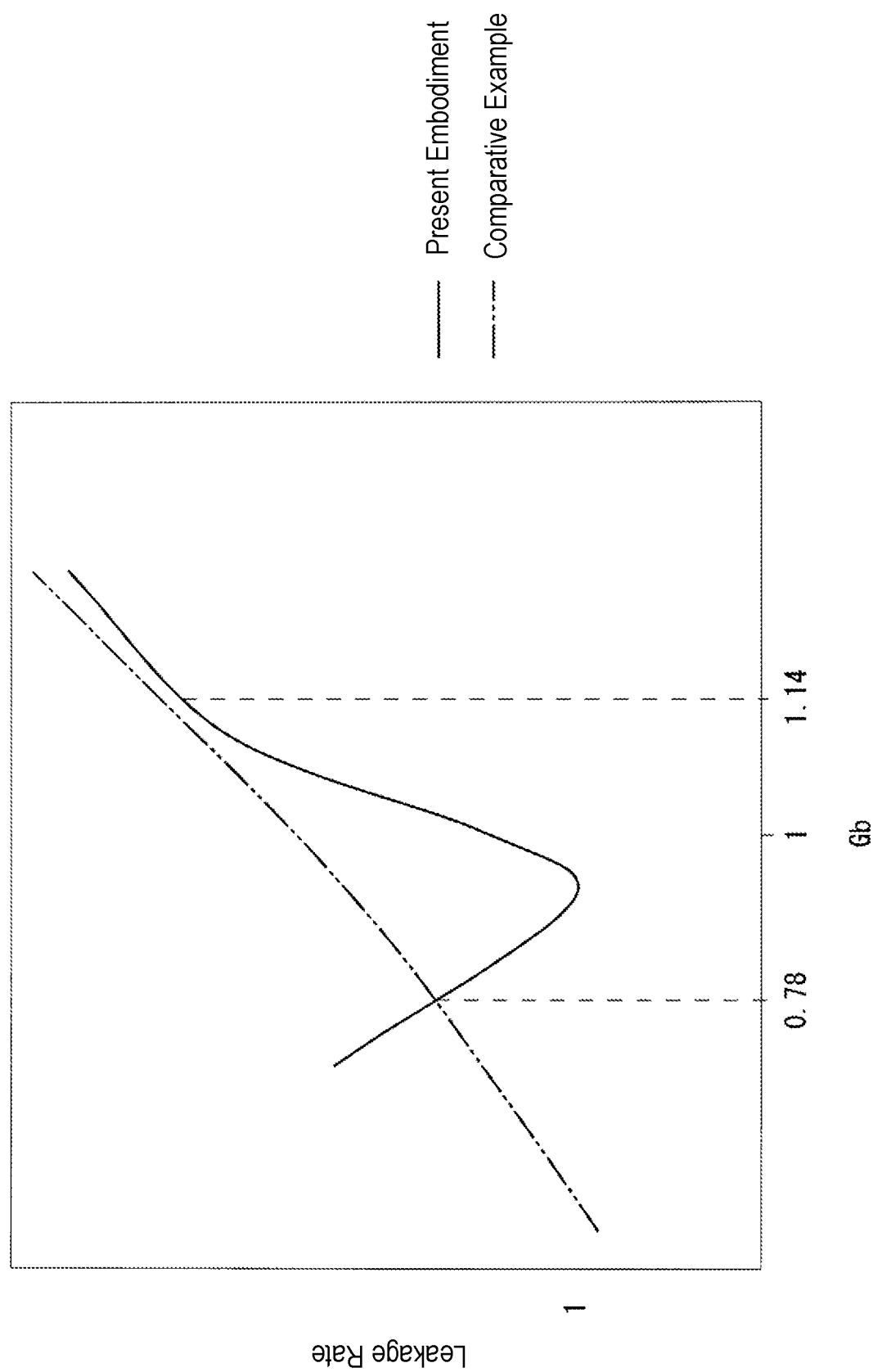
FIG. 6 is a graph showing the relationship between Gb (see FIG. 3) and a leakage rate.

The distance Gb and the distance Lb were examined by the CFD analyzing. As a result, it is found that the leakage rate is changed depending on Gb as shown in FIG. 6. Herein, the leakage rate when the distance Gb is changed variously is examined without changing the position of the low-step-portion annular groove 72 illustrated in FIG. 3 (without changing the distance Lb). In addition, when the distance Gb is equal to the distance Lb, the distance Gb is set to 1. "Comparative Example" of FIG. 6 is the case of a labyrinth seal which does not include the low-step-portion annular groove 72 illustrated in FIG. 3. In Comparative Example, as the third fin 53 approaches the step-down structure step portion 42, that is, Gb becomes smaller, the leakage rate is reduced. In the graph shown in FIG. 6, the unit of the leakage rate of the vertical axis is set dimensionless. Herein, in this embodiment, when the distance Gb is equal to the distance Lb, the distance Gb is set to 1, and thus, the relationship between Gb and the leakage rate shown in FIG. 6 is equal to the relationship between Gb/Lb and the leakage rate. Therefore, in this embodiment, the Gb of the horizontal axis of the graph shown in FIG. 6 may be interchanged with Gb/Lb.

When the distance Lb illustrated in FIG. 3 is too smaller than the distance Gb, that is, the low-pressure-side side surface 72b is away too much toward the high-pressure side X1 relative to the high-pressure-side side surface 53a, there arises the following problem. In this case, the fluid flowing through the branch point B illustrated in FIG. 2 is less likely to flow into the low-step-portion annular groove 72, and the flow rate of the branch flow F4 is increased, and thus, the effect of reducing the leakage rate is reduced. In addition, when the distance Lb illustrated in FIG. 3 is larger than the distance Gb, that is, the low-pressure-side side surface 72b is away too much toward the low-pressure side X2 relative to the high-pressure-side side surface 53a, there arises the following problem. In this case, since the gap δ3 between the distal end of the third fin 53 and the low-pressure-side low step portion 48 illustrated in FIG. 2 becomes large, the fluid is likely to pass through the gap δ3, and the effect of reducing the leakage rate is reduced.

In this regard, it is preferable to satisfy the relationship "0.78<Gb/Lb<1.14" as shown in FIG. 6. In this case, the leakage rate can be reduced reliably as compared with the case of Comparative Example. In addition, Gb/Lb is more preferably from about 0.8 to 1 (0.8 or more and 1 or less). It is still more preferable to set the position of the low-pressure-side side surface 72b in the flow direction X and the position of the high-pressure-side side surface 53a in the flow direction X at substantially the same position. When Gb/Lb is from about 0.8 to 1, the effect of reducing the leakage rate can be improved as compared with the case where Gb/Lb is less than 0.8 or more than 1. G/L may be set so as to satisfy the relationship "Gb/Lb<1.14". The above-described analysis is performed in a case where the rotation axis A side (see FIG. 1) is the low-pressure side X2, and the side away from the rotation axis A is the high-pressure side X1 (i.e. the case where the rotary machine 1 is a compressor). On the other hand, as long as the structure of the labyrinth seal 30 is similar, it is considered that the same effect can be obtained also in a case where the rotation axis A side is the high-pressure side X1, and the side away from the rotation axis A is the low-pressure side X2 (i.e. the case where the rotary machine 1 is an expander).

(First Effect of the Invention)

The effect obtained by the labyrinth seal 30 illustrated in FIG. 2 is as follows. The labyrinth seal 30 is provided in the rotary machine 1. The rotary machine 1 includes the stationary body 10, the rotary body 20, and the gap 25. The rotary body 20 faces the stationary body 10. The gap 25 is formed between the stationary body 10 and the rotary body 20. The gap 25 is configured to allow a fluid to flow from the high-pressure side X1 to the low-pressure side X2 in the flow direction X. The flow direction X is a direction perpendicular to the facing direction Y. The facing direction Y is a direction where the stationary body 10 faces the rotary body 20. In the facing direction Y, the side of the stationary body 10 relative to the rotary body 20 is defined as the one side Y1 of the facing direction. In the facing direction Y, the side of the rotary body 20 relative to the stationary body 10 is defined as the other side Y2 of the facing direction. The labyrinth seal 30 includes the step portion 40, the fin 50, and the annular groove 70. The step portion 40 is formed in a portion of the rotary body 20 on the one side Y1 of the facing direction. The fin 50 extends from a portion of the stationary body 10 on the one side Y1 of the facing direction to the other side Y2 of the facing direction. The annular groove 70 is formed in a portion of the rotary body 20 on the one side Y1 of the facing direction.

[Configuration 1-1]

The step portion 40 includes the step-up structure step portion 41 facing the high-pressure side X1 and the step-down structure step portion 42 facing the low-pressure side X2. In the step-up structure step portion 41 and the step-down structure step portion 42, the step portion arranged on the high-pressure side X1 is defined as the high-pressure-side X1 step portion (in this embodiment, the step-up structure step portion 41), and the step portion arranged on the low-pressure side X2 is defined as the low-pressure-side X2 step portion (in this embodiment, the step-down structure step portion 42).

[Configuration 1-2]

The fin 50 includes the first fin 51, the second fin 52, and the third fin 53. The first fin 51 is arranged on the high-pressure side X1 relative to the high-pressure-side X1 step portion (step-up structure step portion 41). The second fin 52 is arranged on the low-pressure side X2 relative to the high-pressure-side X1 step portion (step-up structure step portion 41) as well as on the high-pressure side X1 relative to the low-pressure-side X2 step portion (step-down structure step portion 42). The third fin 53 is arranged on the low-pressure side X2 relative to the low-pressure-side X2 step portion (step-down structure step portion 42).

[Configuration 1-3]

The annular groove 70 is arranged in at least a part of a region on the low-pressure side X2 relative to the high-pressure-side X1 step portion (step-up structure step portion 41) as well as on the high-pressure side X1 relative to the third fin 53.

The labyrinth seal 30 mainly includes the above-described [Configuration 1-1] and [Configuration 1-2]. Therefore, the vortex V2 is generated on the low-pressure side X2 relative to the high-pressure-side X step portion (step-up structure step portion 41) as well as on the high-pressure side X1 relative to the second fin 52. In addition, the vortex V4 is generated on the low-pressure side X2 relative to the low-pressure-side X2 step portion (step-down structure step portion 42) as well as on the high-pressure side X1 relative to the third fin 53. In this regard, the labyrinth seal 30 includes the above-described [Configuration 1-3]. Therefore, the vortex V (at least one of the vortex V2 and the vortex V4) flows into the annular groove 70. Therefore, as compared with a case where the annular groove 70 is not provided, the vortex V can be expanded, the flow rate of the vortex V can be increased, and the flow velocity of the vortex V can be increased. Therefore, the friction between fluids in the vortex V and the periphery thereof can be increased, and thus, the energy loss of the fluid can be increased. As a result, it is possible to reduce the leakage of the fluid in the gap 25.

(Fourth Effect of the Invention)

In the fins 50 on the low-pressure side X2 relative to the step-up structure step portion 41, the fin which is closest to the step-up structure step portion 41 is defined as the high-step portion-side fin (in this embodiment, the second fin 52).

[Configuration 4]

The annular groove 70 includes the high-step-portion annular groove 71. The high-step-portion annular groove 71 is arranged in at least a part of a region on the low-pressure side X2 relative to the step-up structure step portion 41 as well as on the high-pressure side X1 relative to the high-step portion-side fin (second fin 52).

In the labyrinth seal 30 including the above-described [Configuration 1-1] and [Configuration 1-2], the vortex V2 is formed in the region on the low-pressure side X2 relative to the step-up structure step portion 41 as well as on the high-pressure side X1 relative to the high-step portion-side fin (second fin 52). In this regard, the labyrinth seal 30 includes the high-step-portion annular groove 71 having the above-described [Configuration 4]. Therefore, the vortex V2 flows into the high-step-portion annular groove 71. Therefore, as compared with a case where the high-step-portion annular groove 71 is not provided (see FIG. 12), the vortex V2 can be expanded, the flow rate of the vortex V2 can be increased, and the flow velocity of the vortex V2 can be increased. Therefore, the friction between fluids in the vortex V2 and the periphery thereof can be increased, and thus the energy loss of the fluid can be increased. As a result, it is possible to reduce the leakage of the fluid in the gap 25.

In the labyrinth seal 30 including the above-described [Configuration 1-1] and [Configuration 1-2], the branch flow F1 is formed by branching toward the gap δ2 between the high-step portion-side fin (second fin 52) and the rotary body 20 from the vortex V2. Herein, in a case where the high-step-portion annular groove 71 is not provided, the fluid flowing to the other side Y2 of the facing direction along the second fin 52 comes into contact with (blown off) the high step portion 47 and easily flows to the gap 62 (to be easily the branch flow F1). In this regard, the labyrinth seal 30 includes the high-step-portion annular groove 71 having the above-described [Configuration 4]. Therefore, the vortex V2 is likely to flow into the high-step-portion annular groove 71. Therefore, the amount of the branch flow F1 branched from the vortex V2 can be reduced, and thus, the leakage of the fluid in the gap 25 can be reduced further.

(Fifth Effect of the Invention)

La, Ga, and Ta illustrated in FIG. 3 are defined as follows. La is a distance in the flow direction X from the step-up structure step portion 41 to the portion which is the end of the high-step-portion annular groove 71 on the one side Y1 of the facing direction as well as the end of the high-step-portion annular groove 71 on the low-pressure-side X2. Ga is a distance in the flow direction X from the step-up structure step portion 41 to the portion which is the distal end of the high-step portion-side fin (second fin 52) as well as the end of the high-step portion-side fin (second fin 52) on the high-pressure-side X1. Ta is a width of the distal end of the high-step portion-side fin (second fin 52) in the flow direction X.

[Configuration 5]

At that time, the relationship "0<La/Ga<1.2+Ta/Ga" is satisfied.

According to [Configuration 5] above, the gap δ2 (see FIG. 2) between the high-step portion-side fin (second fin 52) and the rotary body 20 can be reduced as compared with a case where the relationship "1.2+Ta/Ga<La/Ga" is satisfied. Therefore, the leakage of the fluid from the gap δ2 can be reduced further, and the leakage of the fluid in the gap 25 can be reduced further (see FIG. 4).

(Sixth Effect of the Invention)

[Configuration 6]

The relationship "0.6<La/Ga<1.2+Ta/Ga" is satisfied.

According to [Configuration 6] above, the flow rate of the vortex V2 flowing into the high-step-portion annular groove 71 illustrated in FIG. 2 can be increased as compared with a case where the relationship "La/Ga≤0.6" is satisfied. Therefore, the energy loss of the fluid in the vortex V2 can be increased further, and thus, the leakage of the fluid in the gap 25 can be reduced further (see FIG. 4).

(Seventh Effect of the Invention)

As illustrated in FIG. 3, the width of the step-up structure step portion 41 in the facing direction Y is defined as Ha. The width of the high-step-portion annular groove 71 in the facing direction Y is defined as Da.

[Configuration 7]

At this time, the relationship "0.6<Da/Ha" is satisfied.

According to [Configuration 7] above, the flow rate of the vortex V2 flowing into the high-step-portion annular groove 71 illustrated in FIG. 2 can be increased as compared with a case where the relationship "Da/Ha<0.6" is satisfied. Therefore, the energy loss of the fluid in the vortex V2 can be increased further, and thus, the leakage of the fluid in the gap 25 can be reduced further.

(Eighth Effect of the Invention)

In the fins 50 on the low-pressure side X2 relative to the step-down structure step portion 42, the fin which is closest to the step-down structure step portion 42 is defined as the low-step portion-side fin (in this embodiment, the third fin 53).

[Configuration 8]

The annular groove 70 includes the low-step-portion annular groove 72. The low-step-portion annular groove 72 is arranged in at least a part of a region on the low-pressure side X2 relative to the step-down structure step portion 42 as well as on the high-pressure side X1 relative to the low-step portion-side fin (third fin 53).

Figure 11:
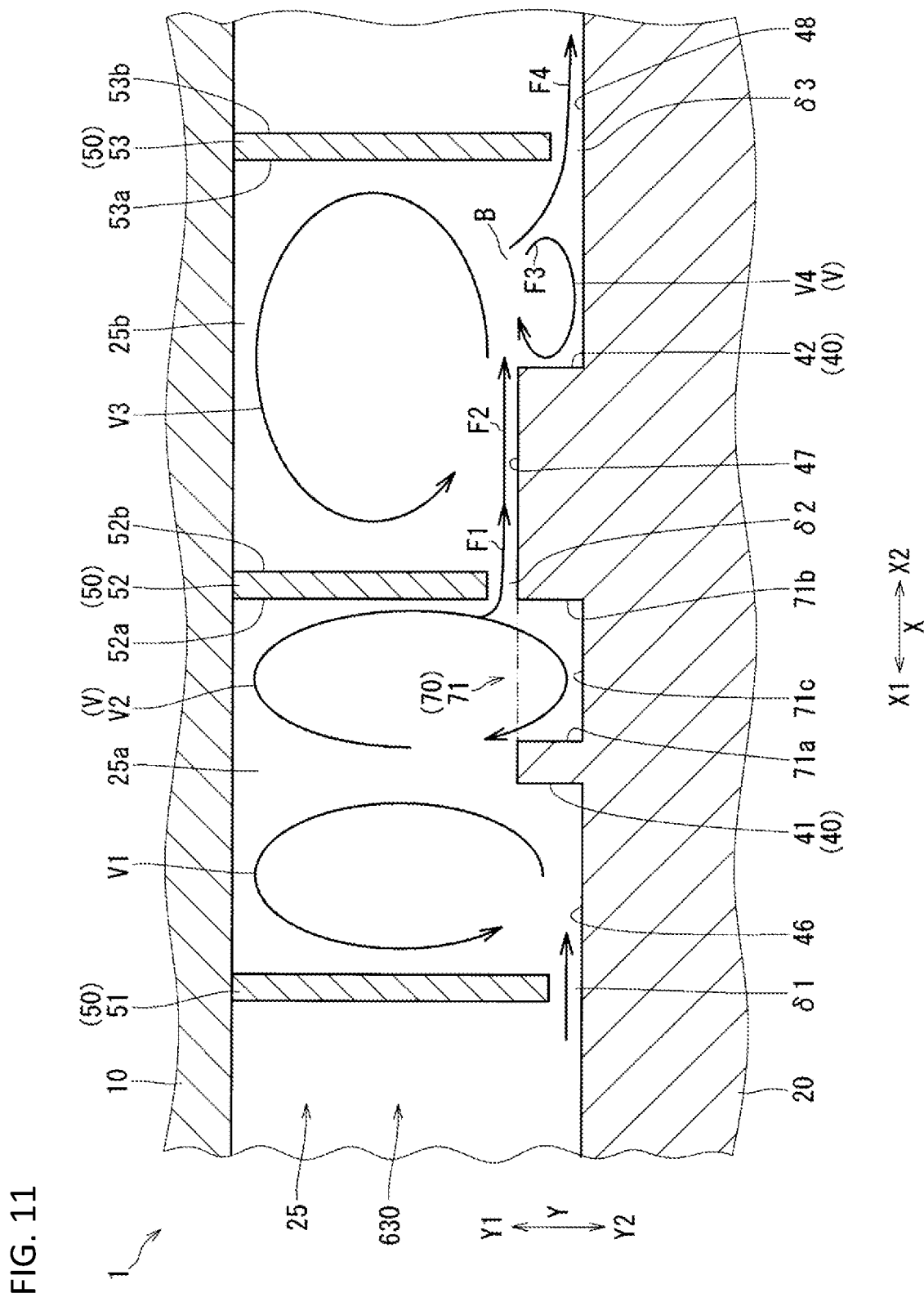
FIG. 11 shows a sixth embodiment and corresponds to FIG. 2.

The vortex V4 is formed in the region on the low-pressure side X2 relative to the step-down structure step portion 42 as well as on the high-pressure side X1 relative to the low-step portion-side fin (third fin 53). In this regard, the labyrinth seal 30 includes the low-step-portion annular groove 72 having the above-described [Configuration 8]. Therefore, the vortex V4 flows into the low-step-portion annular groove 72. Therefore, as compared with a case where the low-step-portion annular groove 72 is not provided (see FIG. 11), the vortex V4 can be expanded, the flow rate of the vortex V4 can be increased, and the flow velocity of the vortex V4 can be increased. For example, as illustrated in FIG. 11, as compared with the case of the flat vortex V4 in which the width in the flow direction X is larger than the width in the facing direction Y, the width of the vortex V4 in the facing direction Y can be increased. Therefore, the friction between fluids in the vortex V4 and the periphery thereof can be increased, and thus the energy loss of the fluid can be increased. As a result, it is possible to reduce the leakage of the fluid in the gap 25.

In the labyrinth seal 30, the main flow F2 branches into the branch flow F3 and the branch flow F4 at the branch point B. Herein, in a case where the low-step-portion annular groove 72 is not provided, the fluid flowing to the other side Y2 of the facing direction at the branch point B comes into contact with the low-pressure-side low step portion 48 and easily flows to the gap δ3 (to be easily the branch flow F4). In this regard, the labyrinth seal 30 includes the low-step-portion annular groove 72 having the above-described [Configuration 8]. Therefore, the fluid flowing to the other side Y2 of the facing direction at the branch point B is likely to flow into the low-step-portion annular groove 72 (the amount of the branch flow F3 is easily increased). Therefore, the amount of the fluid (branch flow F4) flowing toward the gap δ3 from the branch point B can be reduced, and thus, the leakage of the fluid in the gap 25 can be reduced.

(Ninth Effect of the Invention)

Gb and Lb illustrated in FIG. 3 are defined as follows. Gb is a distance in the flow direction X from the step-down structure step portion 42 to the distal end of the low-step portion-side fin (third fin 53). Lb is a distance in the flow direction X from the step-down structure step portion 42 to the portion which is the end of the low-step-portion annular groove 72 on the one side Y1 of the facing direction as well as the end of the low-step-portion annular groove 72 on the low-pressure-side X2.

[Configuration 9]

At this time, the relationship "0.78<Gb/Lb<1.14" is satisfied.

According to [Configuration 9] above, the gap δ3 (see FIG. 2) between the low-step portion-side fin (third fin 53) and the rotary body 20 can be reduced as compared with a case where the relationship "Gb/Lb≤0.78" is satisfied. Therefore, the leakage of the fluid from the gap δ3 can be reduced further, and thus, the leakage of the fluid in the gap 25 can be reduced further (see FIG. 6). In addition, the flow rate of the vortex V4 flowing into the low-step-portion annular groove 72 illustrated in FIG. 2 can be increased as compared with a case where the relationship "1.14≤Gb/Lb" is satisfied. Therefore, the energy loss of the fluid in the vortex V4 can be increased further, and thus, the leakage of the fluid in the gap 25 can be reduced further (see FIG. 6).

(Tenth Effect of the Invention)

[Configuration 10]

The low-step-portion annular groove 72 is formed on the low-pressure side X2 relative to the position of the step-down structure step portion 42.

In the above-described [Configuration 10] above, the low-step-portion annular groove 72 is widely formed so as to extend toward the high-pressure side X1 to the limit. Therefore, the volume of the low-step-portion annular groove 72 can be increased, and thus, the vortex V4 can be expanded. Therefore the energy loss of the fluid in the vortex V4 can be increased further, and thus, the leakage of the fluid in the gap 25 can be reduced.

(Twelfth Effect of the Invention)

[Configuration 12]

The step-up structure step portion 41 is the high-pressure-side X1 step portion (see the above-described [Configuration 1-1]). The step-down structure step portion 42 is the low-pressure-side X2 step portion (see the above-described [Configuration 1-1]).

According to [Configuration 12] above, the same effect as the above-described "(first effect of the invention)" can be obtained.

Second Embodiment

Figure 7:
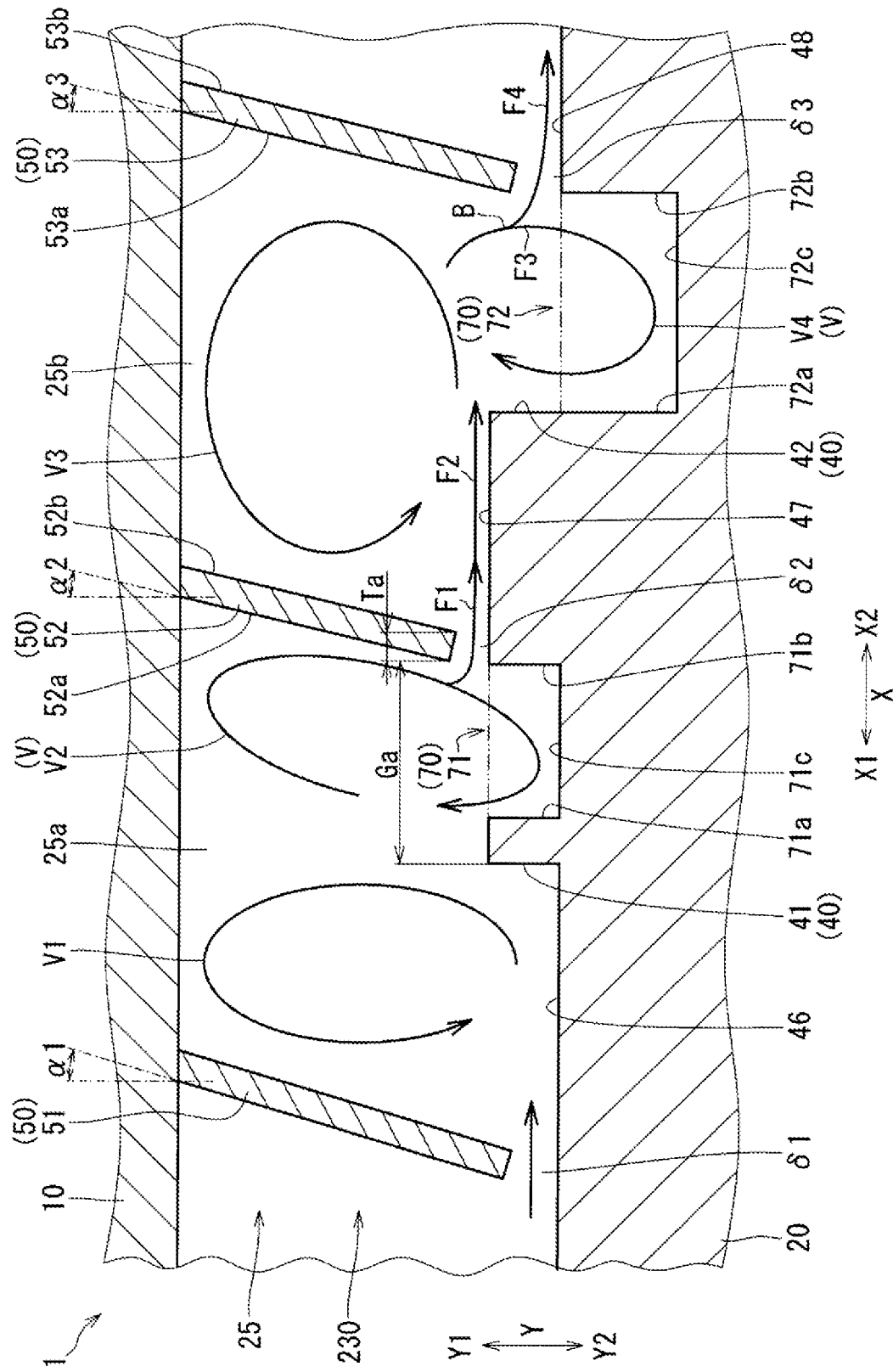
FIG. 7 shows a second embodiment and corresponds to FIG. 2.

With respect to a labyrinth seal 230 of the second embodiment, the difference from the first embodiment is described by referring to FIG. 7. As to the labyrinth seal 230 of the second embodiment, the same reference numerals as in the first embodiment are used for the parts in common with the first embodiment, and description of the parts is omitted (the same is true for the description of other embodiments in terms of omitting the description of parts in common). The difference is the inclination of the fin 50 relative to the facing direction Y.

The distal end of the second fin 52 is arranged on the high-pressure side X1 relative to the proximal end (the end on the one side Y1 of the facing direction) of the second fin 52. In the rotation axis cross-section, the second fin 52 has a linear shape, the high-pressure-side side surface 52a has a linear shape, and the low-pressure-side side surface 52b has a linear shape. In the rotation axis cross-section, the high-pressure-side side surface 52a is inclined at an angle α2 relative to the facing direction Y. In the rotation axis cross-section, the second fin 52 may have a curved shape and may have a bent shape such as an L shape (the same is true for the first fin 51 and the third fin 53).

The first fin 51 and the third fin 53 are configured similarly to the second fin 52. In the rotation axis cross-section, the side surface of the first fin 51 on the high-pressure side X1 is inclined at an angle α1 relative to the facing direction Y. In the rotation axis cross-section, the high-pressure-side side surface 53a of the third fin 53 is inclined at an angle α3 relative to the facing direction Y. All the angle α1, the angle α2, and the angle α3 may be same, some of the angles may be the same, or all the angles may be different. In addition, any one of the angle α1, the angle c2, and the angle α3 may be 0°.

(Eleventh Effect of the Invention)

The effect based on the labyrinth seal 230 illustrated in FIG. 7 is as follows. The labyrinth seal 230 includes at least one of the following [Configuration 11-1] and [Configuration 11-2].

[Configuration 11-1]

In the fins 50 on the low-pressure side X2 relative to the high-step-portion annular groove 71, the fin which is closest to the high-step-portion annular groove 71 is defined as the low-pressure-side X2 fin (in this embodiment, the second fin 52). The distal end of the low-pressure-side X2 fin (second fin 52) is arranged on the high-pressure side X1 relative to the proximal end of the low-pressure-side X2 fin (second fin 52).

[Configuration 11-2]

In the fins 50 on the low-pressure side X2 relative to the low-step-portion annular groove 72, the fin which is closest to the low-step-portion annular groove 72 is defined as the low-pressure-side X2 fin (in this embodiment, the third fin 53). The distal end of the low-pressure-side X2 fin (third fin 53) is arranged on the high-pressure side X1 relative to the proximal end of the low-pressure-side X2 fin (third fin 53).

In a case where the labyrinth seal 30 includes the above-described [Configuration 11-1], the following effect can be obtained. The vortex V2 is likely to flow to the high-pressure side X1 while flowing to the other side Y2 of the facing direction along the low-pressure-side X2 fin (second fin 52). Therefore, the amount of the branch flow F1 flowing toward the low-pressure side X2 can be reduced, and the flow rate of the vortex V2 flowing into the high-step-portion annular groove 71 can be increased. Therefore, the leakage of the fluid in the gap 25 can be reduced further.

In a case where the labyrinth seal 30 includes the above-described [Configuration 11-2], the following effect can be obtained. The fluid (the fluid flowing through the branch point B) which shifts to the other side Y2 of the facing direction by the third fin 53 is likely to flow to the high-pressure side X1 while flowing to the other side Y2 of the facing direction. Therefore, the amount of the branch flow F4 flowing toward the low-pressure side X2 can be reduced, and the flow rate of the vortex V4 flowing into the low-step-portion annular groove 72 can be increased. Further, the fluid (main flow F2) flowing to the low-pressure side X2 toward the third fin 53 comes into contact with the third fin 53 and is likely to flow to the one side Y1 of the facing direction (easily form the vortex V3) and is less likely to flow to the other side Y2 of the facing direction. Therefore, the amount of the branch flow F4 can be reduced. As a result, the leakage of the fluid in the gap 25 can be reduced further.

Third Embodiment

Figure 8:
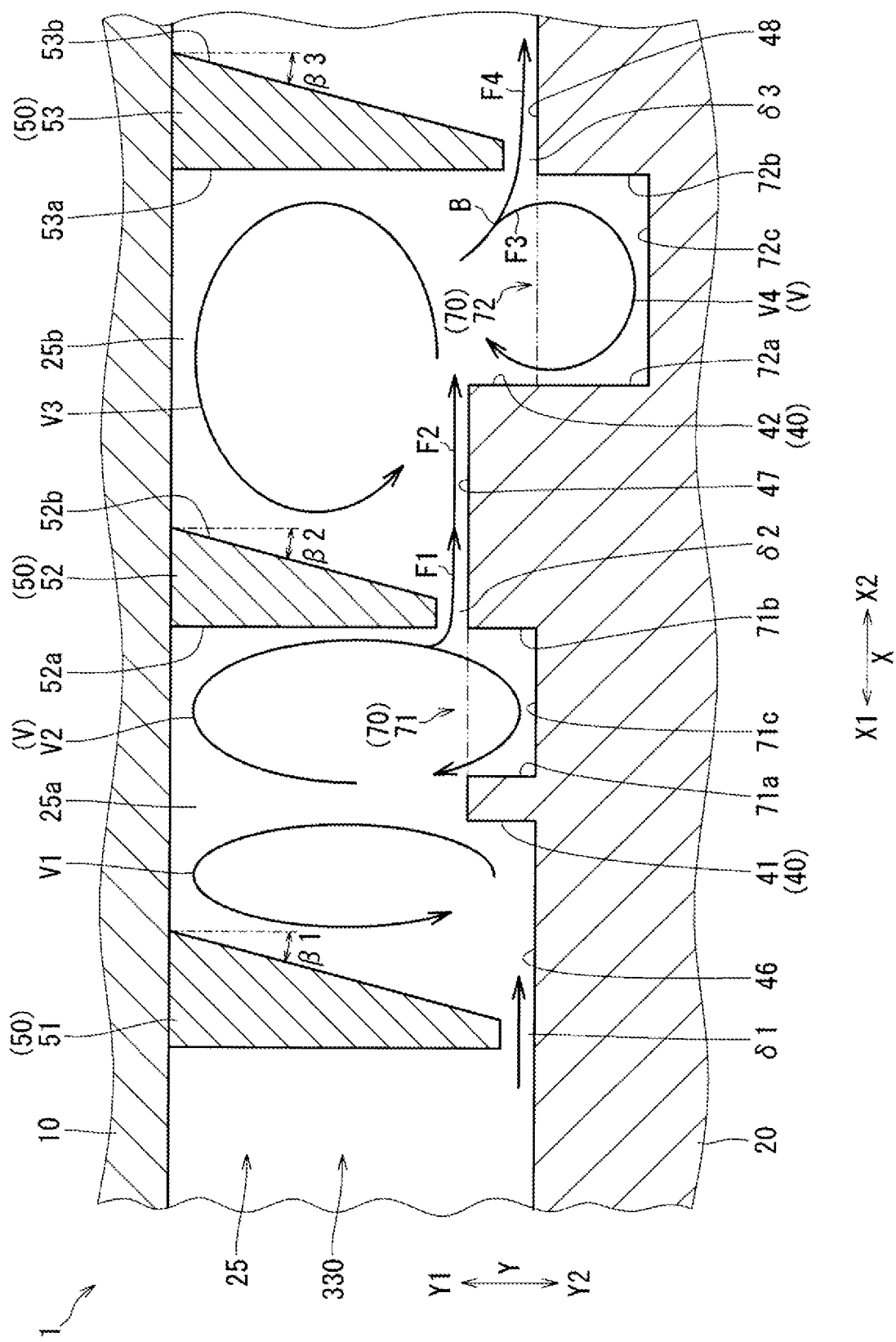
FIG. 8 shows a third embodiment and corresponds to FIG. 2.

With respect to a labyrinth seal 330 of the third embodiment, the difference from the first embodiment is described by referring to FIG. 8. The low-pressure-side side surface 52b of the second fin 52 is inclined at the angle θ2 relative to the facing direction Y. The width of the second fin 52 in the flow direction X becomes narrower toward the other side Y2 of the facing direction. The first fin 51 and the third fin 53 are configured similarly to the second fin 52. The side surface of the first fin 51 on the low-pressure side X2 is inclined at the angle (31 relative to respect to the facing direction Y. The low-pressure-side side surface 53b of the third fin 53 is inclined at the angle θ3 relative to respect to the facing direction Y. All the angle 31, the angle f32, the angle f33 may be the same, some of the angles may be the same, or all the angles may be different.

Fourth Embodiment

Figure 9:
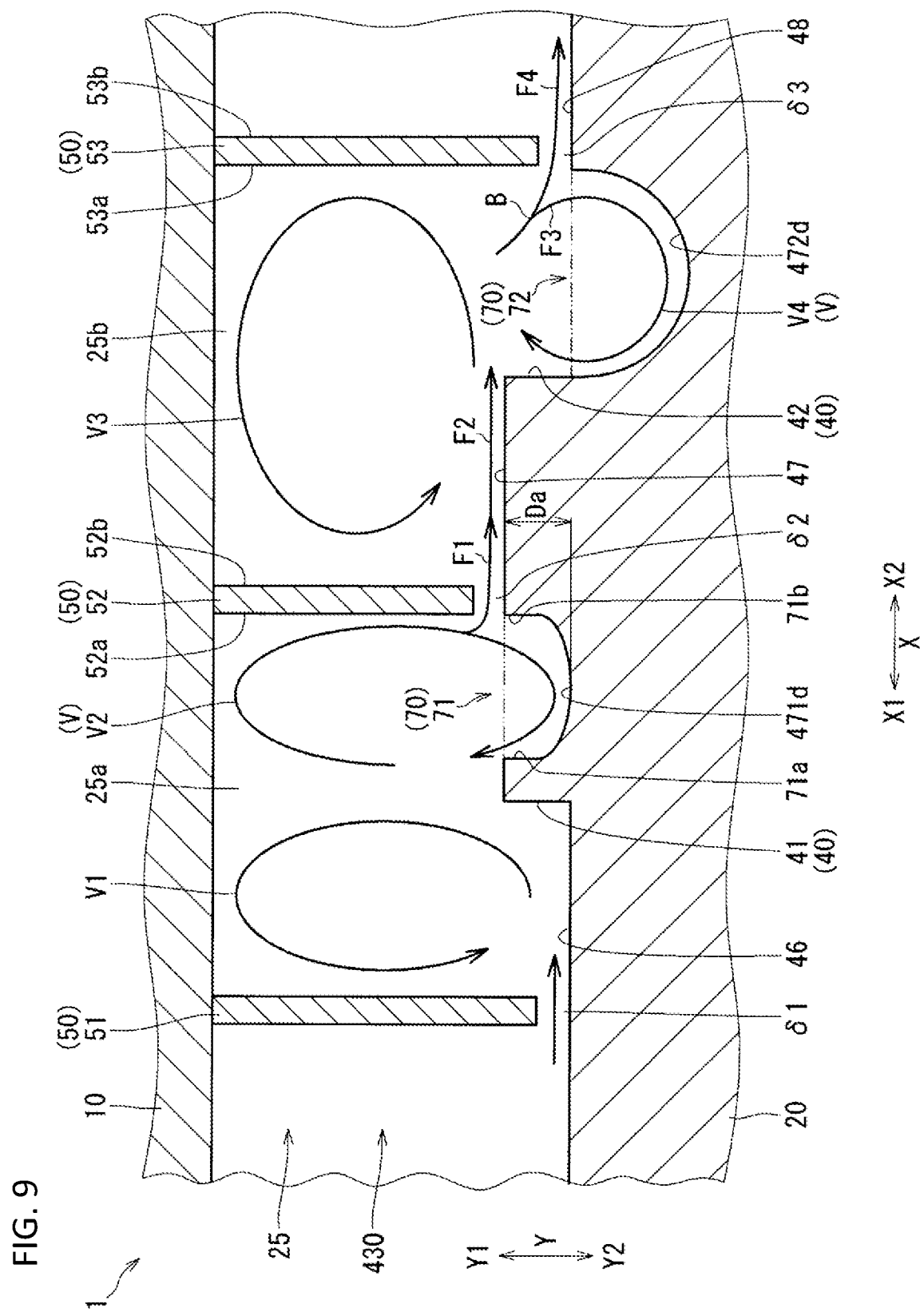
FIG. 9 shows a fourth embodiment and corresponds to FIG. 2.

With respect to a labyrinth seal 430 of the fourth embodiment, the difference from the first embodiment is described by referring to FIG. 9. The difference is that the high-step-portion annular groove 71 includes an arc-shaped portion 471d, and the low-step-portion annular groove 72 includes the arc-shaped portion 472d.

The arc-shaped portion 471d is provided in the bottom of the high-step-portion annular groove 71. The cross section (contour) of the arc-shaped portion 471d in the rotation axis cross-section has an arc shape protruding toward the other side Y2 of the facing direction, an elliptical arc shape (a curved line constituting a part of an ellipse), and a semi-elliptical arc shape. The above-described "elliptical arc shape" encompasses a substantially elliptical arc shape (for example, a substantially semi-elliptical arc shape). The high-pressure-side side surface 71a and the low-pressure-side side surface 71b are provided to be continuous with the arc-shaped portion 471d. In a case where the arc-shaped portion 471d is provided, the high-pressure-side side surface 71a and the low-pressure-side side surface 71b may not be provided (the same is true for the low-step-portion annular groove 72).

The arc-shaped portion 472d is provided in the bottom of the low-step-portion annular groove 72. The cross section of the arc-shaped portion 472d in the rotation axis cross-section has an arc shape protruding toward the other side Y2 of the facing direction, a circular arc shape, and a semi-circular arc shape (the central angle of the circular arc is 180°). The central angle of the circular arc may be less than 180°. The above-described "circular arc shape" encompasses a substantially circular arc shape (for example, a substantially semi-circular arc shape). Only one of the arc-shaped portion 471d and the arc-shaped portion 472d may be provided. In the rotation axis cross-section, the cross section of the arc-shaped portion 471d may have a circular arc shape, and the cross section of the arc-shaped portion 472d may have an elliptical arc shape.

(Second Effect of the Invention)

The effect based on the labyrinth seal 430 illustrated in FIG. 9 is as follows. The labyrinth seal 430 includes at least one of the following [Configuration 2-1] and [Configuration 2-2].

[Configuration 2-1]

As viewed from a direction perpendicular to each of the facing direction Y and the flow direction X, the cross section of the bottom (arc-shaped portion 471d) of the high-step-portion annular groove 71 has an arc shape protruding toward the other side Y2 of the facing direction.

[Configuration 2-2]

As viewed from a direction perpendicular to each of the facing direction Y and the flow direction X, the cross section of the bottom (arc-shaped portion 472d) of the low-step-portion annular groove 72 has an arc shape protruding toward the other side Y2 of the facing direction.

In a case where the labyrinth seal 430 includes the above-described [Configuration 2-1], the shape of the high-step-portion annular groove 71 is a shape close to the shape of the flow of the vortex V2 as compared with a case where the inside of the high-step-portion annular groove 71 in the rotation axis cross-section has a rectangular shape (see FIG. 2). Therefore, the vortex V2 flows along the bottom of the high-step-portion annular groove 71, and thus, the decrease of the flow velocity of the vortex V2 in the high-step-portion annular groove 71 can be prevented. Therefore, the energy loss in the vortex V2 can be increased, and thus, the leakage of the fluid in the gap 25 can be reduced further. Similarly, in a case where the labyrinth seal 430 has the above-described [Configuration 2-2], the vortex V4 flows along the bottom of the low-step-portion annular groove 72, and the energy loss in the vortex V4 can be increased. Thus, the leakage of the fluid in the gap 25 can be reduced further.

Fifth Embodiment

Figure 10:
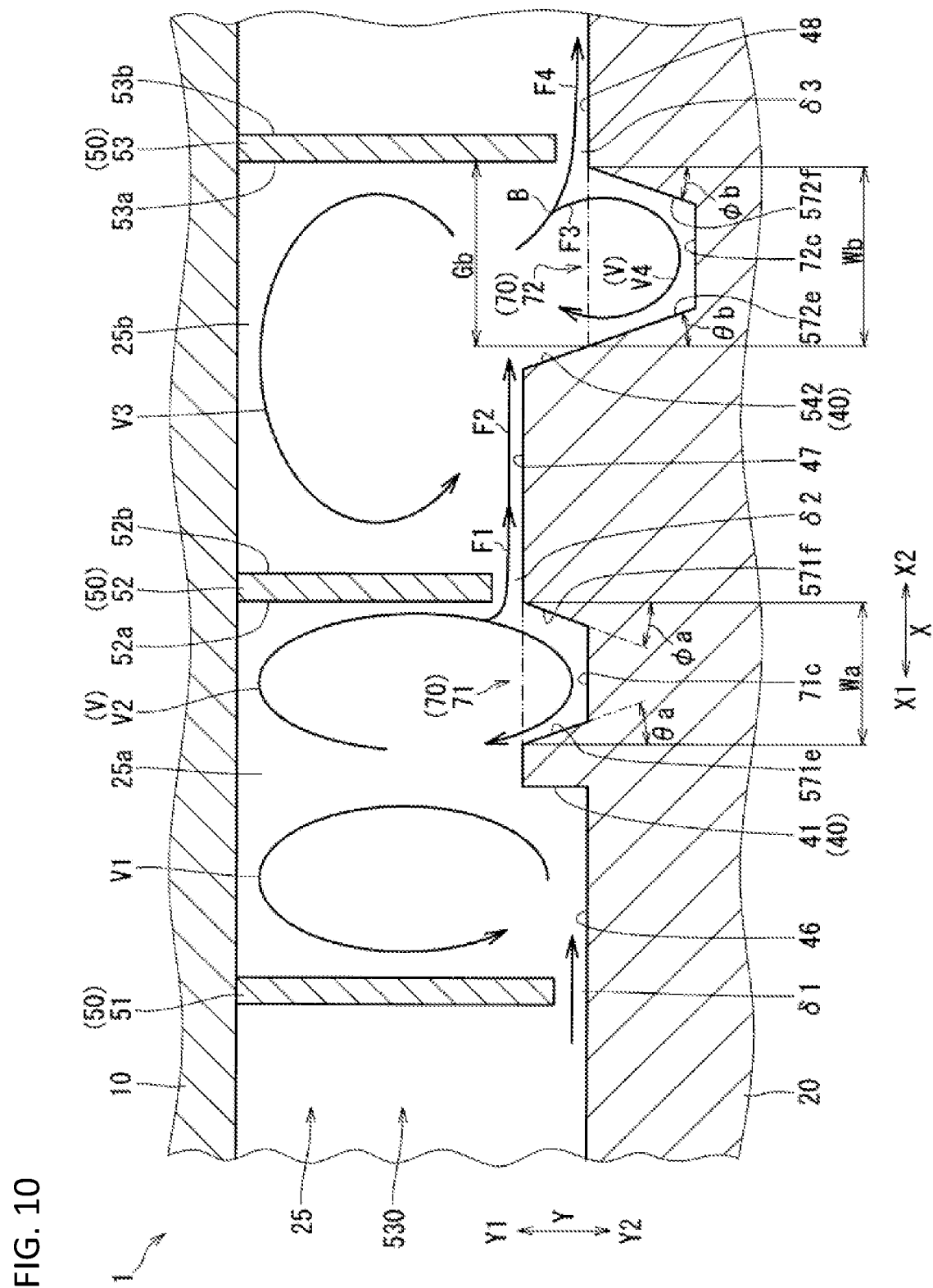
FIG. 10 shows a fifth embodiment and corresponds to FIG. 2.

With respect to a labyrinth seal 530 of the fifth embodiment, the difference from the first embodiment is described by referring to FIG. 10. The difference is the shape of the high-step-portion annular groove 71, the shape of the low-step-portion annular groove 72, and the shape of the step-down structure step portion 542. The high-step-portion annular groove 71 includes a high-pressure-side slant portion 571e (slant portion) and a low-pressure-side slant portion 571f (slant portion). The low-step-portion annular groove 72 includes a high-pressure-side slant portion 572e (slant portion) and a low-pressure-side slant portion 572f (slant portion).

The high-pressure-side slant portion 571e is provided in the high-pressure-side X1 portion of the high-step-portion annular groove 71. The end of the high-pressure-side slant portion 571e on the other side Y2 of the facing direction is arranged on the low-pressure side X2 (the center side of the high-step-portion annular groove 71 in the flow direction X) relative to the end of the high-pressure-side slant portion 571e on the one side Y1 of the facing direction. In the rotation axis cross-section, the high-pressure-side slant portion 571e has a linear shape and is inclined at the angle θa relative to the facing direction Y.

The low-pressure-side slant portion 571f is provided in the portion of the high-step-portion annular groove 71 on the low-pressure side X2. The end of the low-pressure-side slant portion 571f on the other side Y2 of the facing direction is arranged on the high-pressure side X1 (the center side of the annular groove 70 in the flow direction X) relative to the end of the low-pressure-side slant portion 571f on the one side Y1 of the facing direction. In the rotation axis cross-section, the low-pressure-side slant portion 571f has a linear shape and is inclined at the angle (pa relative to the facing direction Y.

The high-pressure-side slant portion 572e is configured similarly to the high-pressure-side slant portion 571e of the high-step-portion annular groove 71. In the rotation axis cross-section, the high-pressure-side slant portion 572e is inclined at the angle θb relative to the facing direction Y. In the rotation axis cross-section, the step-down structure step portion 542 is inclined at the angle θb relative to the facing direction Y similarly to the high-pressure-side slant portion 572e. In the rotation axis cross-section, the high-pressureside slant portion 572e and the step-down structure step portion 542 have a linear shape.

The low-pressure-side slant portion 572f is configured similarly to the low-pressure-side slant portion 571f of the high-step-portion annular groove 71. In the rotation axis cross-section, the low-pressure-side slant portion 572f is inclined at the angle φb relative to the facing direction Y. All the high-pressure-side slant portion 571e, the low-pressure-side slant portion 571f, the high-pressure-side slant portion 572e, and the low-pressure-side slant portion 572f may be provided, or only some portions may be provided. In addition, all the sizes of the angle θa, the angle φa, the angle θb, and the angle φb may be equal, only some sizes may be equal, or all the sizes may be different. In addition, the step-down structure step portion 542 may not be inclined relative to the facing direction Y.

(Third Effect of the Invention)

The effect based on the labyrinth seal 530 illustrated in FIG. 10 is as follows. The high-step-portion annular groove 71 includes a slant portion (at least one of the high-pressure-side slant portion 571e and the low-pressure-side slant portion 571f) provided in at least one of the high-pressure-side X1 portion of the high-step-portion annular groove 71 and the low-pressure-side X2 portion of the high-step-portion annular groove 71. The labyrinth seal 530 has at least one of the following [Configuration 3-1] and [Configuration 3-2].

[Configuration 3-1]

The end of the high-pressure-side slant portion 571e on the other side Y2 of the facing direction is located close to a center side of the high-step-portion annular groove 71 in the flow direction X (low-pressure side X2) relative to the end of the high-pressure-side slant portion 571e on the one side Y1 of the facing direction.

[Configuration 3-2]

The end of the low-pressure-side slant portion 571f on the other side Y2 of the facing direction is located close to a center side of the high-step-portion annular groove 71 in the flow direction X (high-pressure side X1) relative to the end of the low-pressure-side slant portion 571f on the one side Y1 of the facing direction.

In a case where the labyrinth seal 530 includes the above-described [Configuration 3-1], the shape of the high-step-portion annular groove 71 is a shape close to the shape of the flow of the vortex V2 as compared with a case where the inside of the high-step-portion annular groove 71 in the rotation axis cross-section is a rectangular shape (see FIG. 2). Therefore, the flow of the vortex V2 flows along the high-pressure-side slant portion 571e, and thus, the decrease of the flow velocity of the vortex V2 in the high-step-portion annular groove 71 can be prevented. Therefore, the energy loss of the vortex V2 can be increased further, and thus, the leakage of the fluid in the gap 25 can be reduced. Similarly, in a case where the labyrinth seal 530 includes the above-described [Configuration 3-2], the flow of the vortex V2 flows along the low-pressure-side slant portion 571f, and the energy loss in the vortex V2 can be increased. Thus, the leakage of the fluid in the gap 25 can be reduced further. Similarly, in a case where the low-step-portion annular groove 72 includes at least one of the high-pressure-side slant portion 572e and the low-pressure-side slant portion 572f, the following effect is obtained. The flow of the vortex V4 flows along the high-pressure-side slant portion 572e or the low-pressure-side slant portion 572f, and the energy loss in the vortex V4 can be increased. Thus, the leakage of the fluid in the gap 25 can be reduced further.

Sixth Embodiment

With respect to a labyrinth seal 630 of the sixth embodiment, the difference from the first embodiment is described by referring to FIG. 11. The labyrinth seal 630 includes the high-step-portion annular groove 71 and does not have the low-step-portion annular groove 72 (see FIG. 2). For this reason, the vortex V4 is smaller than that of the first embodiment. In the labyrinth seal 630, the leakage of the fluid in the gap 25 can be reduced as compared with the labyrinth seal which does not include the high-step-portion annular groove 71 and the low-step-portion annular groove 72 (the same is true for a seventh embodiment).

Seventh Embodiment

Figure 12:
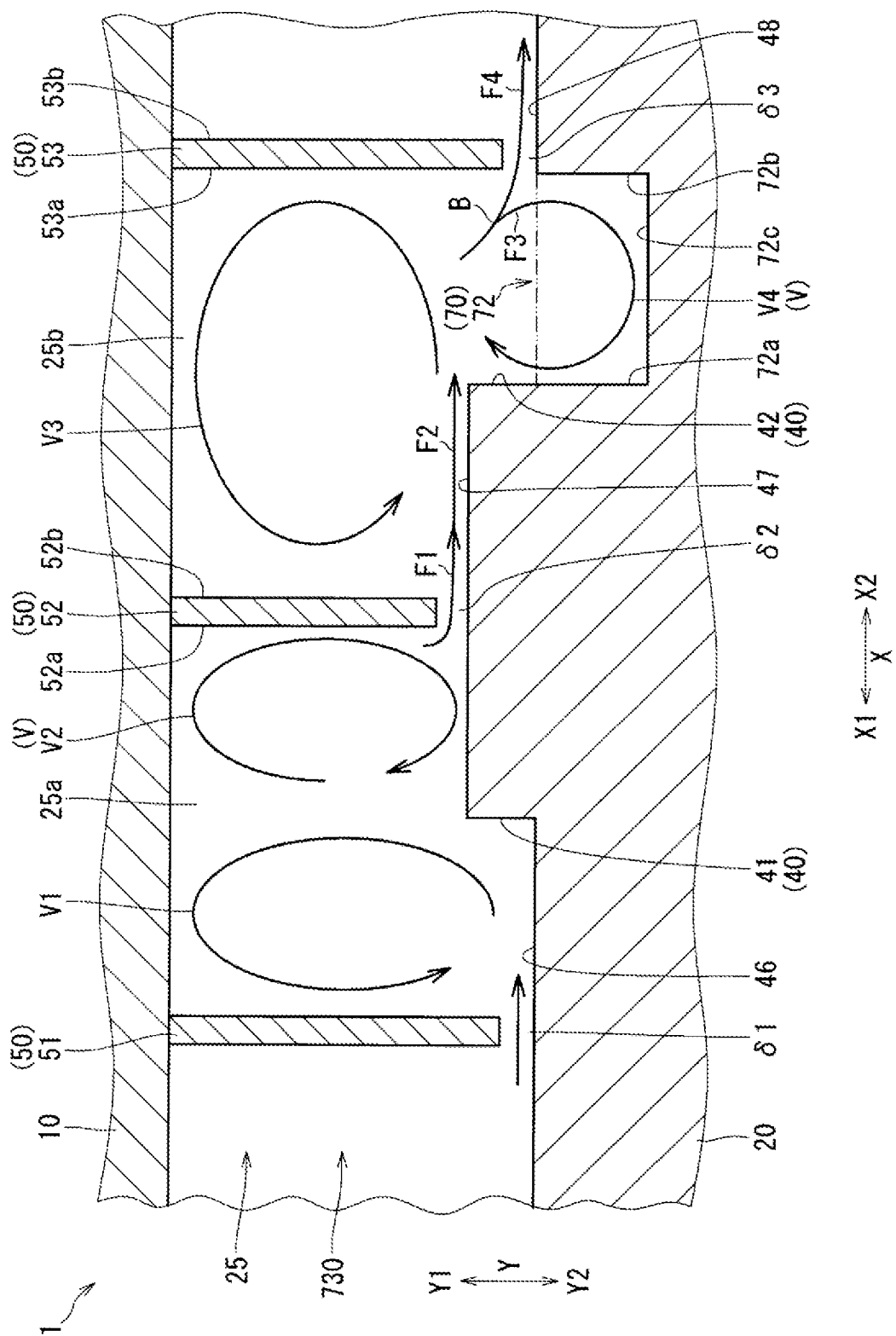
FIG. 12 shows a seventh embodiment and corresponds to FIG. 2.

With respect to a labyrinth seal 730 of the seventh embodiment, the difference from the first embodiment is described by referring to FIG. 12. The labyrinth seal 730 includes the low-step-portion annular groove 72 and does not include the high-step-portion annular groove 71 (see FIG. 2). For this reason, the vortex V2 is smaller than that of the first embodiment.

Eighth Embodiment

Figure 13:
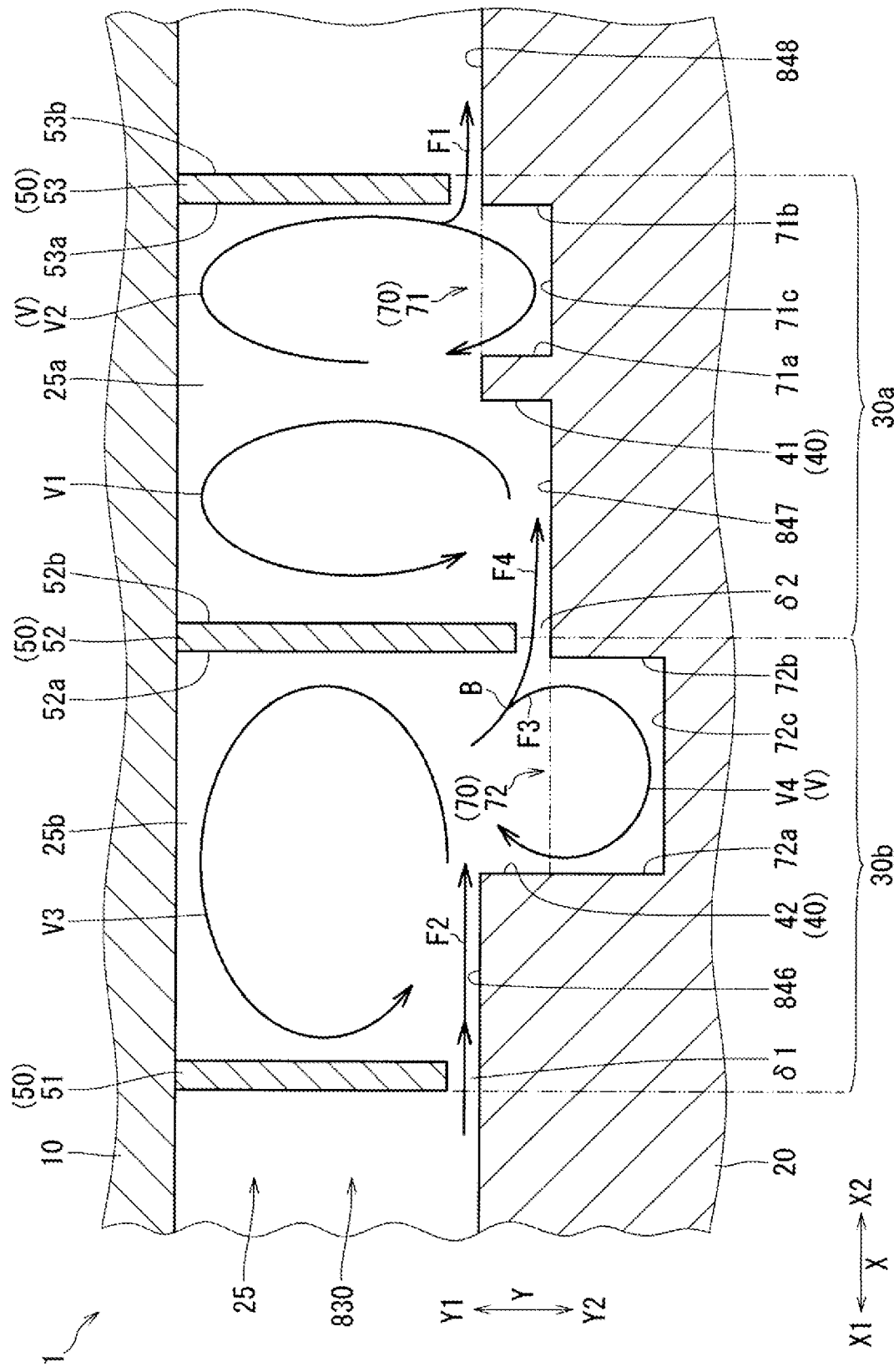
FIG. 13 shows an eighth embodiment and corresponds to FIG. 2.

With respect to a labyrinth seal 830 of the eighth embodiment, the difference from the first embodiment is described by referring to FIG. 13.

As illustrated in FIG. 2, in the labyrinth seal 30 of the first embodiment, the structure 30b on the step-down structure side is arranged close to the low-pressure side X2 relative to the structure 30a on the step-up structure side. On the other hand, as illustrated in FIG. 13, in the labyrinth seal 830 of the eighth embodiment, the structure 30b on the step-down structure side is arranged close to the high-pressure side X1 relative to the structure 30a on the step-up structure side. The flow of the fluid in the structure 30a on the step-up structure side in the first embodiment is the same as the flow of the fluid in the structure 30a on the step-up structure side in the eighth embodiment (the same is true for the flow of the fluid in the structure 30b on the step-down structure side).

Hereinafter, the constituent elements of the first embodiment are described with reference to FIG. 2, and the constituent elements of the eighth embodiment are described with reference to FIG. 13. The above-described "high-pressure-side X1 step portion" is the step-up structure step portion 41 in the first embodiment but is the step-down structure step portion 42 in the eighth embodiment. The above-described "low-pressure-side X2 step portion" is the step-down structure step portion 42 in the first embodiment but is the step-up structure step portion 41 in the eighth embodiment. The above-described "high-step portion-side fin" is the second fin 52 in the first embodiment but is the third fin 53 in the eighth embodiment. The above-described "low-step portion-side fin" is the third fin 53 in the first embodiment but is the second fin 52 in the eighth embodiment.

The labyrinth seal 30 of the first embodiment includes the high-pressure-side low step portion 46, the high step portion 47, and the low-pressure-side low step portion 48 in this order from the high-pressure side X1 to the low-pressure side X2. On the other hand, the labyrinth seal 830 of the eighth embodiment includes a high-pressure-side high step portion 846 (high-pressure-side plane), a low step portion 847 (down-step portion, intermediate step portion, or intermediate plane), and a low-pressure-side high step portion 848 (up-step portion, or low-pressure-side plane) in this order from the high-pressure side X1 to the low-pressure side X2. The low step portion 847 is arranged on the other side Y2 of the facing direction relative to the high-pressure-side high step portion 846. The low-pressure-side high step portion 848 is arranged on the one side Y1 of the facing direction relative to the low step portion 847. The position of the low-pressure-side high step portion 848 in the facing direction Y may be the same as the position of the high-pressure-side high step portion 846 in the facing direction Y, may be on the one side Y1 of the facing direction relative to the high-pressure-side high step portion 846, and may be the other side Y2 of the facing direction relative to the high-pressure-side high step portion 846.

(Thirteenth Effect of the Invention)

The effect based on the labyrinth seal 830 illustrated in FIG. 13 is as follows.

[Configuration 13]

The step-down structure step portion 42 is the high-pressure-side X1 step portion. The step-up structure step portion 41 is the low-pressure-side X2 step portion.

According to [Configuration 13] above, the same effect as the above-described "(first effect of the invention)" is obtained.

Ninth Embodiment

Figure 14:
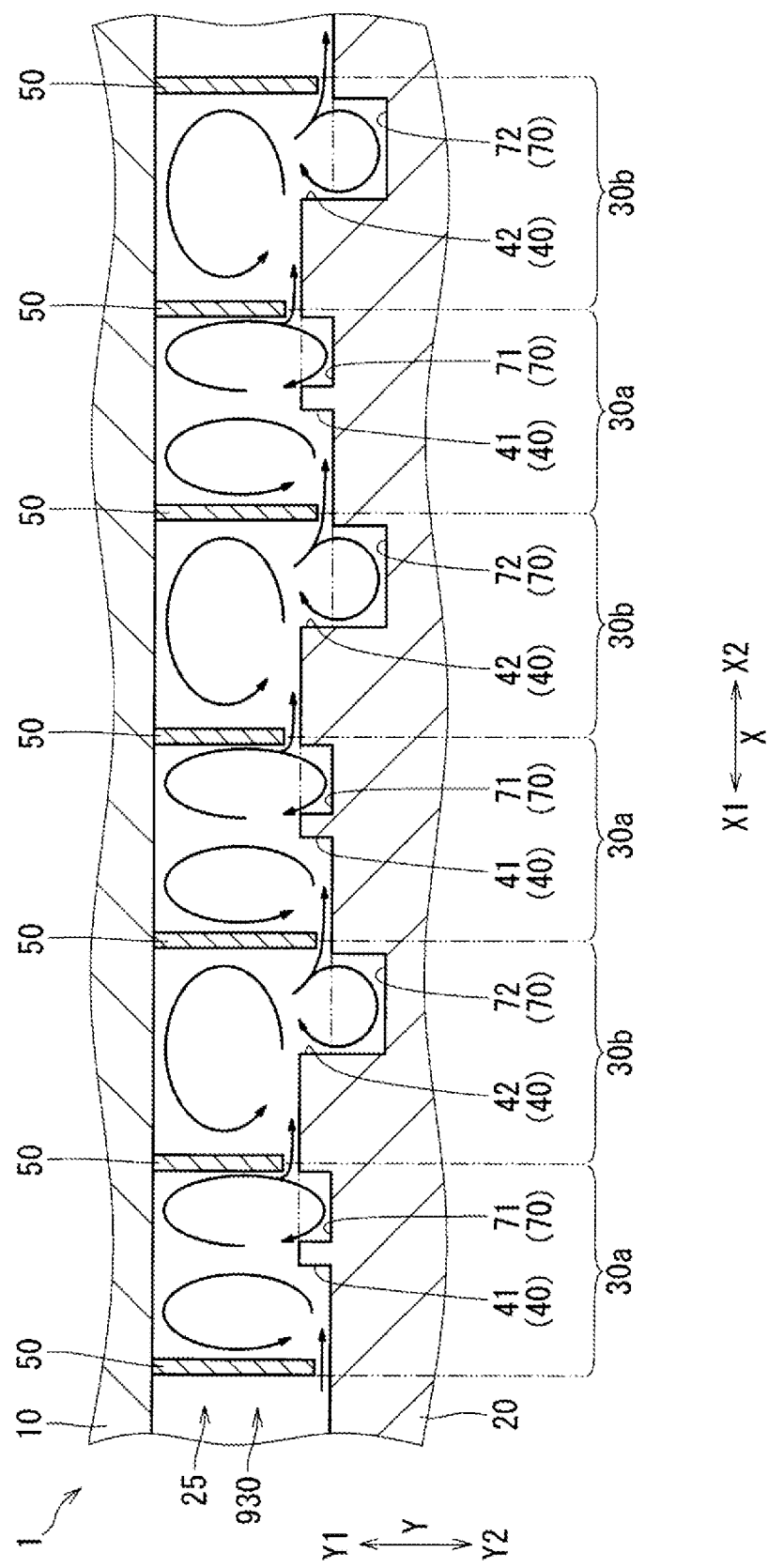
FIG. 14 is a cross-sectional view of a labyrinth seal according to a ninth embodiment.

A labyrinth seal 930 of the ninth embodiment is described with reference to FIG. 14. The labyrinth seal 930 includes a plurality of structures 30*a* on the step-up structure side similarly to the first embodiment illustrated in FIG. 2 and includes a plurality of structures 30*b* on the step-down structure side similarly to the first embodiment. As illustrated in FIG. 14, for example, the number of the structures 30*a* on the step-up structure side is three, and the number of the structures 30*b* on the step-down structure side is three. These numbers may be changed. The number of the structures 30*a* on the step-up structure side is the same as the number of the structures 30*b* on the step-down structure side (each is three) and may be different. The structure 30*a* on the step-up structure side and the structure 30*b* on the step-down structure side are arranged side by side in the flow direction X, is arranged to be adjacent in the flow direction X, and is alternately arranged in the flow direction X.

The labyrinth seal 930 may be modified as in the second to seventh embodiments. In addition, in the structure 30*a* on the step-up structure side and the structure 30*b* on the step-down structure side, the structure arranged to be closest to the high-pressure side X1 is the structure 30*a* on the step-up structure side in the example illustrated in FIG. 14 but may be the structure 30*b* on the step-down structure side (the same is true for the eighth embodiment).

(Fifteenth Effect of the Invention)

The effect based on the labyrinth seal 930 illustrated in FIG. 14 is as follows.

[Configuration 14]

A plurality of structures (the structure 30*a* on the step-up structure side and the structure 30*b* on the step-down structure side) including the step-up structure step portion 41, the step-down structure step portion 42, the fin 50, and the annular groove 70 are arranged side by side in the flow direction X.

According to [Configuration 14] above, the leakage of the fluid in the gap 25 can be reduced further as compared with a case where one structure 30*a* on the step-up structure side and one structure 30*b* on the step-down structure side are provided.

Tenth Embodiment

Figure 15:
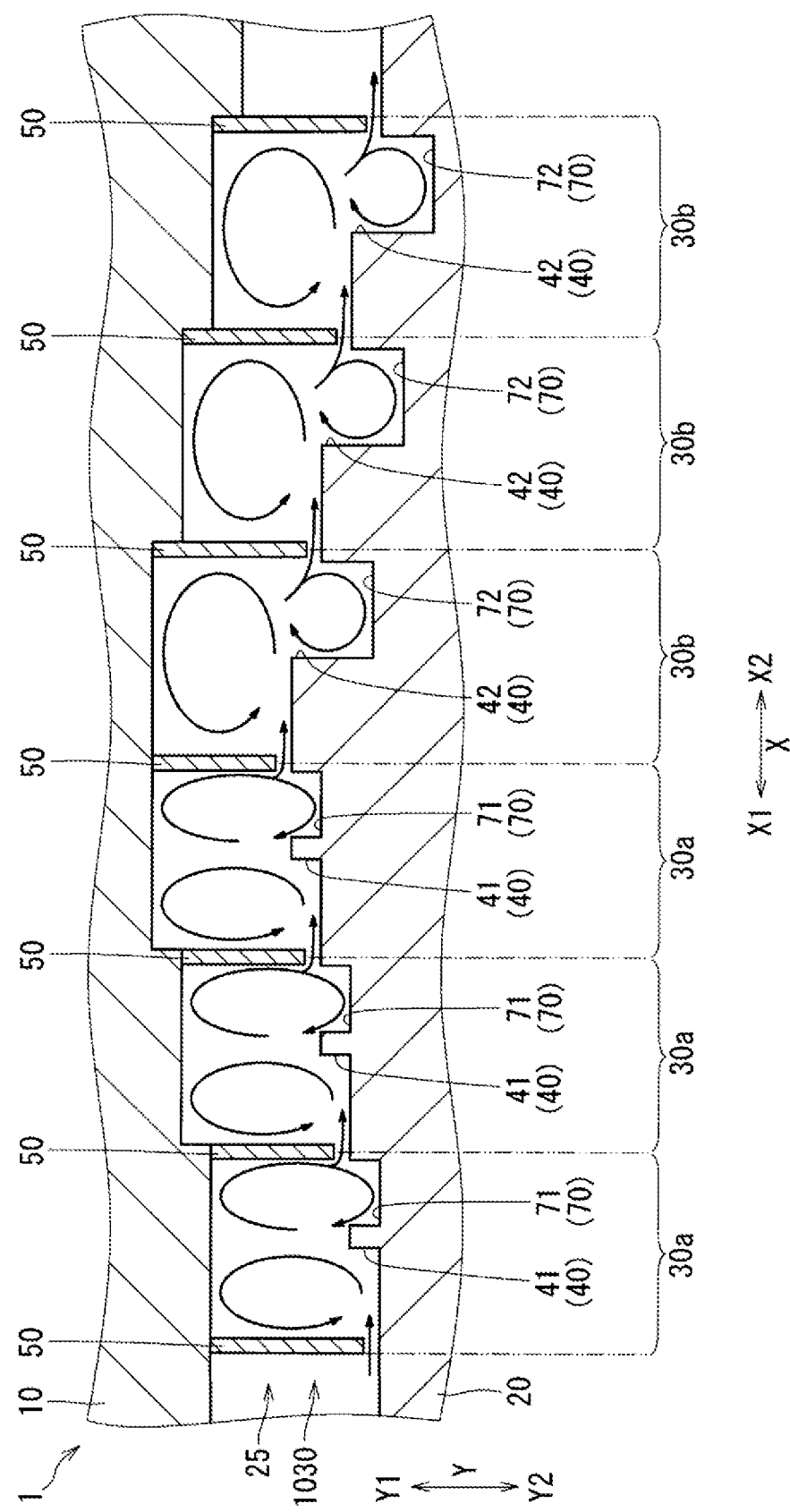
FIG. 15 shows a tenth embodiment and corresponds to FIG. 14.

With respect to a labyrinth seal 1030 of the tenth embodiment, the difference from the ninth embodiment is described by referring to FIG. 15. In the ninth embodiment, the structure 30*a* on the step-up structure side and the structure 30*b* on the step-down structure side are alternately arranged in the flow direction X. On the other hand, in the tenth embodiment, a plurality of (three in FIG. 15) structures 30*a* on the step-up structure side are arranged to be adjacent in the flow direction X. In addition, a plurality of (three in FIG. 15) structures 30*b* on the step-down structure side are arranged to be adjacent in the flow direction X. The structure 30*a* on the step-up structure side closest to the low-pressure side X2 and the structure 30*b* on the step-down structure side closest to the high-pressure side X1 are arranged to be adjacent in the flow direction X. The structure 30*a* on the step-up structure side and the structure 30*b* on the step-down structure side may be arranged side by side in an irregular order in the flow direction X.

(Analysis of Leakage Rate)

By the CFD analysis, the leakage rate was obtained for each of the first structure, the second structure, the third structure, and the structure of Comparative Example which are described below, and the leakage rates were compared. The first structure is a structure which includes the labyrinth seal 1130 illustrated in FIG. 16 and is configured as follows. Similarly to the ninth embodiment (see FIG. 14), three structures 30*a* on the step-up structure side and three structures 30*b* on the step-down structure side are arranged alternately in the flow direction X. The shape of the fin 50 is the same as that of the third embodiment (see FIG. 8). The shape of the annular groove 70 is the same as that of the first embodiment (see FIG. 2). A groove 1172 similar to the low-step-portion annular groove 72 and a step 1142 similar to the step-down structure step portion 42 are provided on the high-pressure side X1 relative to the structure 30*a* on the step-up structure side closest to the high-pressure side X1. In addition, the low-pressure side X2 is closer to the rotation axis A (see FIG. 1) than the high-pressure side X1.

The distance Ca, the distance Cb, and the thickness Tb illustrated in FIG. 3 are defined as follows. The distance Ca is a distance (clearance) in the facing direction Y from the distal end of the second fin 52 to the rotary body 20 (high step portion 47). The distance Cb is a distance in the facing direction from the distal end of the third fin 53 to the rotary body 20 (low-pressure-side low step portion 48). In the model used for analyzing the leakage rate, the distance Cb is the same as the distance Ca. In this regard, the distance Ca and the distance Cb are set to C. The thickness Tb is a width of the distal end of the third fin 53 in the flow direction X.

In the labyrinth seal 1130 illustrated in FIG. 16, dimensionless dimensions using the distance C illustrated in FIG. 3 are as follows (see FIG. 3 for the dimensions).

Ga=5 C
Wa=4.5 C
Ha=2 C
Ea=0.5 C
Ta=0.5 C
La=5 C
Gb=5 C
Wb=5.5 C
Tb=0.5 C

Figure 16:
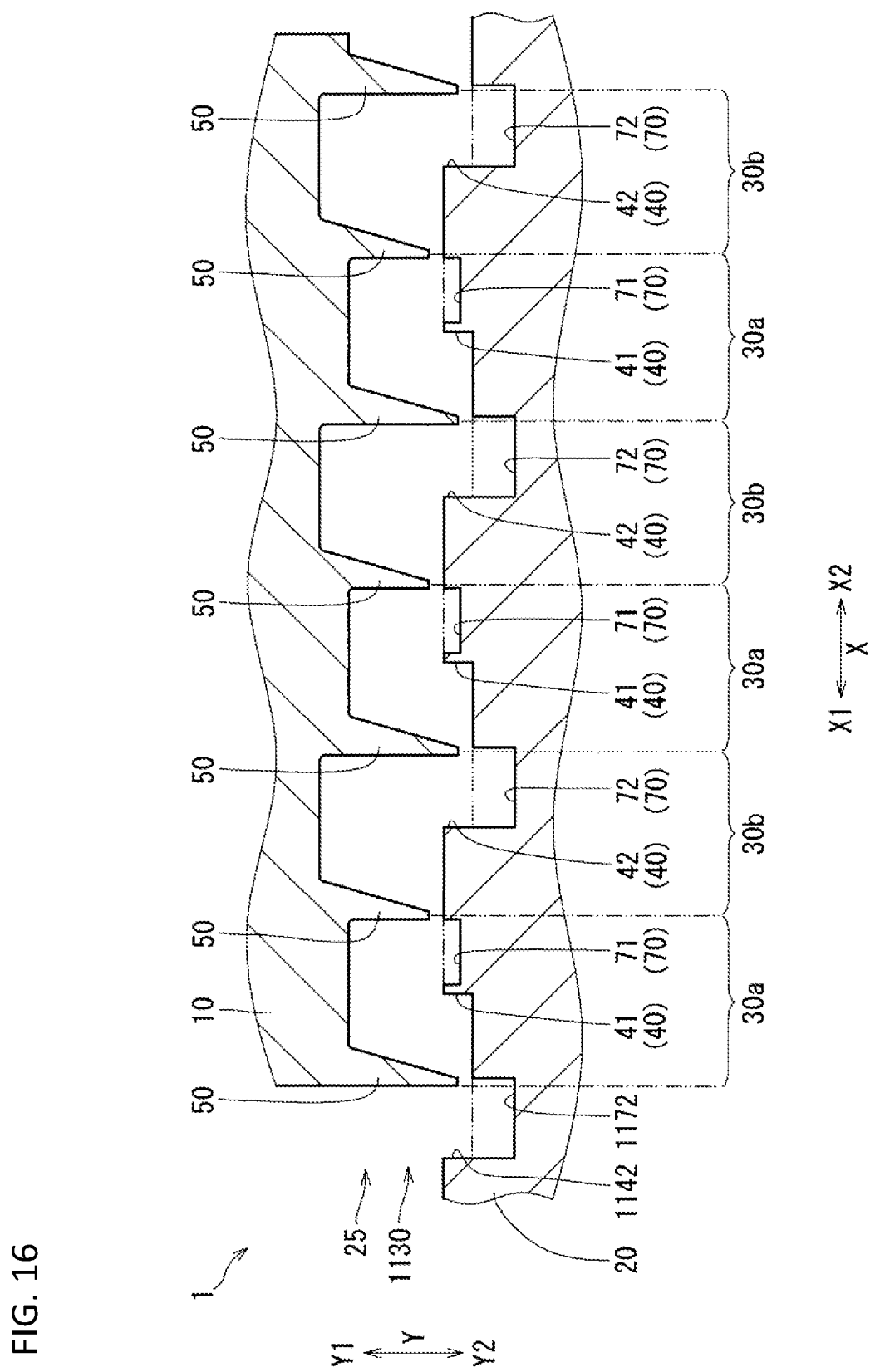
FIG. 16 is a cross-sectional view of a labyrinth seal of a first structure used to analyze a leakage rate.

In the second structure, all the low-step-portion annular grooves 72 and the groove 1172 are not provided in the labyrinth seal 1130 illustrated in FIG. 16 (see the sixth embodiment illustrated in FIG. 11). In the third structure, all the high-step-portion annular grooves 71 are not provided in the labyrinth seal 1130 (see the seventh embodiment illustrated in FIG. 12). In the structure of Comparative Example, all the high-step-portion annular grooves 71, all the low-step-portion annular grooves 72, and the groove 1172 are not provided in the labyrinth seal 1130.

Figure 17:
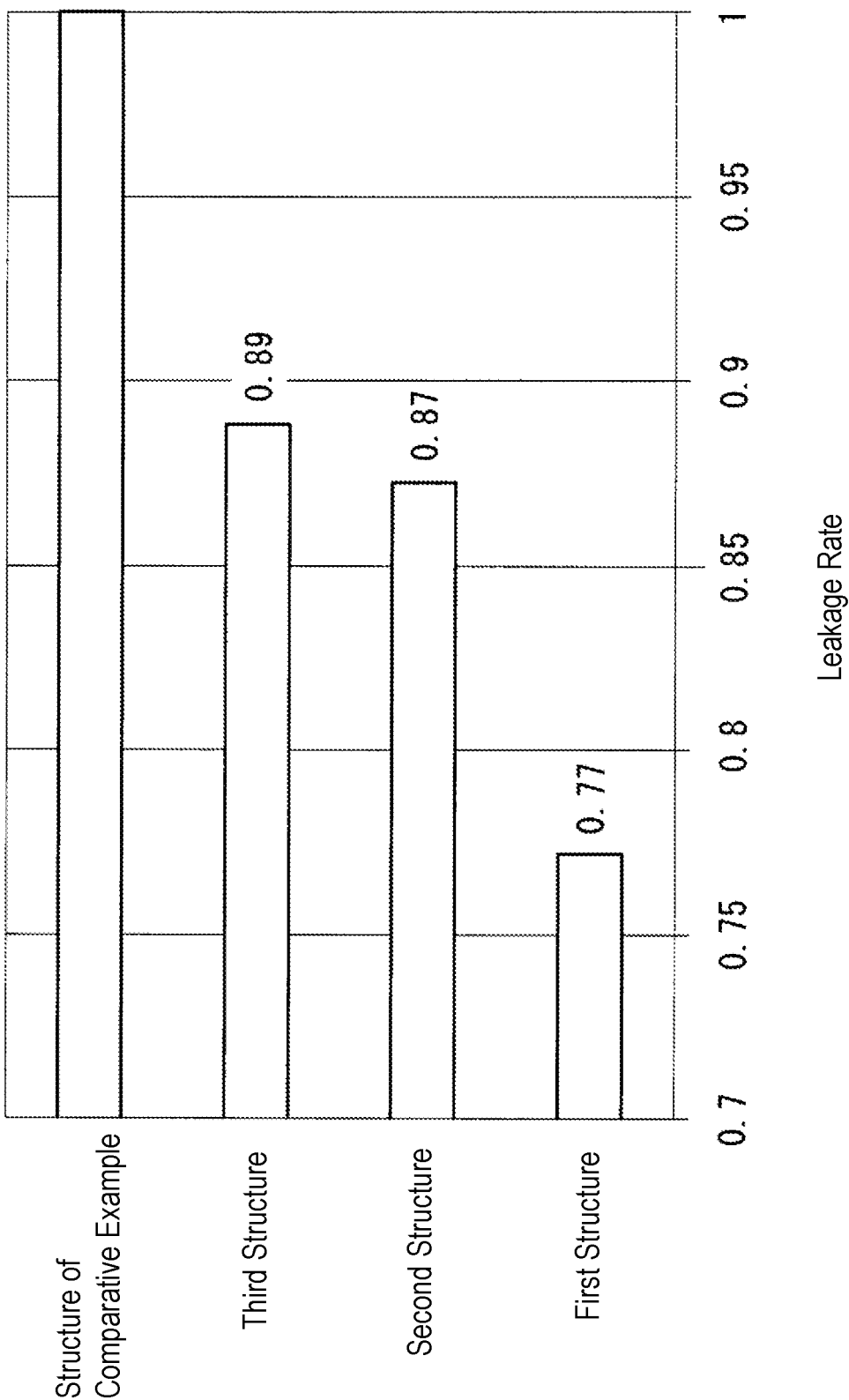
FIG. 17 is a graph showing each leakage rate of four kinds of structures.

The comparison result of the leakage rate is illustrated in FIG. 17. In the second and third structures, the leakage rate could be reduced as compared with the structure of Comparative Example. As compared with the second and third structures, the leakage rate could be reduced further in the first structure. In the first structure, the leakage rate can be reduced by 20% or more as compared with the structure of the comparative example.

(Modifications)

The above-described embodiments may be modified variously. A part of the constituent elements of the above-described embodiments may not be provided. The number of the constituent elements of the embodiments may be changed. The constituent elements of the embodiments different from each other may be combined. For example, the shape of the high-step-portion annular groove 71 and the shape of the low-step-portion annular groove 72 which are illustrated in FIG. 2 or the like may be different. For example, as illustrated in FIG. 2, the configuration in which the inner shape of the high-step-portion annular groove 71 in the rotation axis cross-section is a rectangular shape and the configuration in the low-step-portion annular groove 72 includes the arc-shaped portion 472d as illustrated in FIG. 9 may be combined. For example, at least one of the high-pressure-side slant portion 572e and the low-pressure-side slant portion 572f which are illustrated in FIG. 10 may be added to the low-step-portion annular groove 72 which includes the arc-shaped portion 472d.

This application is based on Japanese Patent Application No. 2016-201957 filed on Oct. 13, 2016, the contents of which are incorporated herein by reference.

DESCRIPTION OF REFERENCE NUMERALS AND SIGNS

1: Rotary machine
10: Stationary body (first member in labyrinth seal 30)
20: Rotary body (second member in labyrinth seal 30)
25: Gap
30, 130, 230, 330, 430, 530, 630, 730, 830, 930, 1030, 1130: Labyrinth seal
40: Step portion
41: Step-up structure step portion (high-pressure-side step portion, low-pressure-side step portion)
42, 542: Step-down structure step portion (high-pressure-side step portion, low-pressure-side step portion)
50: Fin
51: First fin
52: Second fin (low-pressure-side fin, high-step portion-side fin, low-step portion-side fin)
53: Third fin (low-pressure-side fin, high-step portion-side fin, low-step portion-side fin)
70: Annular groove
71: High-step-portion annular groove
72: Low-step-portion annular groove
471d, 472d: Arc-shaped portion
571e, 572e: High-pressure-side slant portion (slant portion)
571f, 572f: Low-pressure-side slant portion (slant portion)
X: Flow direction
X1: High-pressure side
X2: Low-pressure side
Y: Facing direction
Y1: One side of the facing direction
Y2: Other side of the facing direction

The invention claimed is:

1. A labyrinth seal to be included in a rotary machine, the rotary machine comprising:
a first member;
a second member facing the first member; and
a gap formed between the first member and the second member and configured to allow a fluid to flow from a high-pressure side to a low-pressure side in a flow direction that is a direction perpendicular to a direction where the first member and the second member face each other, wherein
in a facing direction which is the direction where the first member and the second member face each other, a side of the first member relative to the second member is defined as one side of the facing direction,
in the facing direction, a side of the second member relative to the first member is defined as other side of the facing direction,
the labyrinth seal comprises:
a step portion formed in a portion of the second member on the one side of the facing direction;
a fin extending from a portion of the first member towards the second member; and
an annular groove formed in a portion of the second member on the one side of the facing direction,
the step portion comprises:
a step-up structure step portion facing the high-pressure side; and
a step-down structure step portion facing the low-pressure side,
in the step-up structure step portion and the step-down structure step portion, a step portion arranged on the high-pressure side is defined as a high-pressure-side step portion, and a step portion arranged on the low-pressure side is defined as a low-pressure-side low step portion, and
the fin comprises:
a first fin arranged on the high-pressure side relative to the high-pressure-side step portion;
a second fin arranged on the low-pressure side relative to the high-pressure-side step portion as well as on the high-pressure side relative to the low-pressure-side step portion; and
a third fin arranged on the low-pressure side relative to the low-pressure-side step portion, and
the annular groove is arranged in at least a part of a region on the low-pressure side relative to the high-pressure-side step portion as well as on the high-pressure side relative to the third fin;
wherein the annular groove comprises a high-step-portion annular groove, formed in the step portion, between the step-up structure step portion and the step-down structure step portion, and on the high-pressure side relative to the second fin;
wherein the first fin and the second fin are immediately adjacent to each other without any other fin between them;

wherein the second fin and the third fin are immediately adjacent to each other without any other fin between them;

wherein the first fin, the high-pressure-side step portion, the high-step-portion annular groove, the second fin, and the low-pressure-side low step portion are arranged in order from the high-pressure-side to the low-pressure-side; and wherein a distal end of the third fin radially faces the low-pressure side low step portion.

2. The labyrinth seal according to claim 1, wherein a cross section of a bottom of the annular groove as viewed from a direction perpendicular to the facing direction and perpendicular to the flow direction has an arc shape protruding toward the other side of the facing direction.

3. The labyrinth seal according to claim 2, wherein the annular groove includes a slant portion formed in at least one of a portion of the annular groove on the high-pressure side and a portion of the annular groove on the low-pressure side, and an end of the slant portion farthest from the first member is located closer to a center side of the annular groove in the flow direction than an end of the slant portion closest to the first member.

4. The labyrinth seal according to claim 1, wherein the annular groove includes a slant portion formed in at least one of a portion of the annular groove on the high-pressure side and a portion of the annular groove on the low-pressure side, and an end of the slant portion farthest from the first member is located closer to a center side of the annular groove in the flow direction than an end of the slant portion closest to the first member.

5. The labyrinth seal according to claim 1, wherein the second fin is defined as a high-step portion portion-side fin, and wherein the following relationship is satisfied:

$0<La/Ga<1.2+Ta/Ga$, wherein La is a distance in the flow direction from a surface of the step-up structure step portion facing the high-pressure side to a surface of the high-step-portion annular groove perpendicular to the flow direction and facing the high-pressure-side, Ga is a distance in the flow direction from a surface of the step-up structure step portion facing the high-pressure side to a high-pressure-side side surface of the high-step portion-side fin, and Ta is a width of the distal end of the high-step portion-side fin in the flow direction.

6. The labyrinth seal according to claim 5, wherein the following relationship is satisfied:

$0.6<La/Ga<1.2+Ta/Ga$.

7. The labyrinth seal according to claim 1, wherein the following relationship is satisfied:

$0.6<Da/Ha$, wherein Ha is a width of the step-up structure step portion in the facing direction, and Da is a width of the high-step-portion annular groove in the facing direction.

8. The labyrinth seal according to claim 1, wherein the third fin is closest to the step-down structure step portion and is defined as a low-step portion-side fin, and the annular groove includes a low-step-portion annular groove arranged in at least a part of a region on the low-pressure side relative to the step-down structure step portion as well as on the high-pressure side relative to the low-step portion-side fin.

9. The labyrinth seal according to claim 8, wherein the low-step-portion annular groove is formed on the low-pressure side relative to a position of the step-down structure step portion.

10. The labyrinth seal according to claim 1, wherein the following relationship is satisfied:

$0.78<Gb/Lb<1.14$, wherein Gb is a distance in the flow direction from a surface of the step-down structure step portion facing the low-pressure side to a high-pressure-side surface of the low-step portion-side fin, and Lb is a distance in the flow direction from a surface of the step-down structure step portion facing the low-pressure side to a surface of the low-step-portion annular groove perpendicular to the flow direction and facing the high-pressure side.

11. The labyrinth seal according to claim 1, wherein in the fins on the low-pressure side relative to the annular groove, the third fin is closest to the annular groove and is defined as a low-pressure-side fin, and a distal end of the low-pressure-side fin is arranged on the high-pressure side relative to a proximal end of the low-pressure-side fin.

12. The labyrinth seal according to claim 1, wherein the step-up structure step portion is the high-pressure-side step portion, and the step-down structure step portion is the low-pressure-side step portion.

13. The labyrinth seal according to claim 1, wherein a plurality of structures are arranged side-by-side in the flow direction, each structure including the step-up structure step portion, the step-down structure step portion, the fin, and the annular groove.

* * * * *